US009356881B2

(12) United States Patent
Tal et al.

(10) Patent No.: US 9,356,881 B2
(45) Date of Patent: May 31, 2016

(54) TRAFFIC SCHEDULING DEVICE

(71) Applicant: Huawei Technologies Co., Ltd., Shenzhen (CN)

(72) Inventors: Alex Tal, Munich (DE); Yoav Peleg, Munich (DE); Alex Umansky, Munich (DE); Keliang Zhang, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 13/718,834

(22) Filed: Dec. 18, 2012

(65) Prior Publication Data
US 2013/0201831 A1 Aug. 8, 2013

Related U.S. Application Data

(63) Continuation of application No. PCT/EP2012/051784, filed on Feb. 2, 2012.

(51) Int. Cl.
*H04L 12/28* (2006.01)
*H04L 12/863* (2013.01)
(Continued)

(52) U.S. Cl.
CPC ............. *H04L 47/625* (2013.01); *H04L 47/50* (2013.01); *H04L 47/60* (2013.01); *H04L 47/622* (2013.01); *H04L 47/6215* (2013.01); *H04L 47/6295* (2013.01); *H04L 49/90* (2013.01)

(58) Field of Classification Search
CPC ..... H04L 12/56; H04L 47/00; H04L 47/6215; H04L 47/622; H04L 47/50
USPC .............. 370/392, 474, 235, 230.1, 412, 415, 370/417
See application file for complete search history.

(56) References Cited

U.S. PATENT DOCUMENTS 6,094,686 A * 7/2000 Sharma .......................... 709/240
7,277,448 B1 * 10/2007 Long ........................ H04L 47/60
370/412

(Continued)

FOREIGN PATENT DOCUMENTS

| CA | 2267021 | * | 3/1999 | .............. H04L 12/56 |
| CN | 101667974 A | | 3/2010 | |
| CN | 101952801 A | | 1/2011 | |

OTHER PUBLICATIONS

International Search Report and Written Opinion of the International Searching Authority issued in corresponding PCT Patent Application No. PCT/EP2012/051784, mailed Oct. 11, 2012, 11 pages.

*Primary Examiner* — Marcus R Smith
*Assistant Examiner* — Dewanda Samuel
(74) *Attorney, Agent, or Firm* — Brinks Gilson & Lione

(57) ABSTRACT

The disclosure relates to a traffic scheduling device for scheduling a transmission sequence of data packets, stored in a plurality of traffic flow queues, an eligibility state of each of the traffic flow queues for the scheduling is being maintained in a hierarchical scheduling database describing a relationship among the plurality of traffic flow queues. The traffic scheduling device includes: a plurality of interconnected memory cluster units. Each memory cluster unit is associated to a single or more levels of the hierarchical scheduling database and each memory cluster unit is coupled to at least one co-processors. At least one co-processor is software-programmable to implement a scheduling algorithm. The traffic scheduling device also includes an interface to the plurality of traffic flow queues.

19 Claims, 16 Drawing Sheets

(51) Int. Cl.
*H04L 12/869* (2013.01)
*H04L 12/861* (2013.01)

(56) References Cited

U.S. PATENT DOCUMENTS

| | | | |
|---|---|---|---|
| 7,283,532 B2* | 10/2007 | Hassan-Ali | H04L 12/5602 370/395.42 |
| 7,321,940 B1* | 1/2008 | Smith et al. | 709/240 |
| 7,680,053 B1* | 3/2010 | Pannell et al. | 370/237 |
| 7,986,706 B2* | 7/2011 | Yip | H04L 12/5693 370/410 |
| 2004/0001491 A1 | 1/2004 | Ruutu et al. | |
| 2005/0177644 A1* | 8/2005 | Basso | H04L 12/5693 709/232 |
| 2007/0204268 A1* | 8/2007 | Drepper | 718/102 |
| 2009/0183161 A1 | 7/2009 | Kolinummi et al. | |
| 2010/0278190 A1* | 11/2010 | Yip | H04L 12/5693 370/412 |
| 2013/0070588 A1* | 3/2013 | Steele | H04L 49/90 370/230 |

* cited by examiner

TRAFFIC SCHEDULING DEVICE

CROSS-REFERENCE TO RELATED APPLICATIONS

This application is a continuation of International Application No. PCT/EP2012/051784, filed on Feb. 2, 2012, which is hereby incorporated by reference in its entirety.

BACKGROUND

The present disclosure relates to traffic scheduling and to the field of traffic management in telecommunication routers and switch systems, in particular when a high performance, flexible traffic scheduling is required.

One of the key building blocks of a network equipment modern router or switch system for packet switched networks is a hierarchical traffic management unit. A traffic management unit is used in the packet-processing data path to implement Service Level Agreements (SLAs) and associated Quality of Service (QoS) and bandwidth provisioning requirements. A Service Level Agreement is a negotiated agreement between two parties, e.g. a customer and a service provider. The SLA may specify the levels of availability, serviceability, performance, operation, or other attributes of the service, such as billing. Quality of Service is the ability to provide different priorities to different applications, users, or data flows, or to guarantee a certain level of performance to a data flow. For example, a required bit rate, delay, jitter, packet dropping probability and/or bit error rate may be guaranteed. Bandwidth provisioning is the process of measuring and controlling the communications, i.e. traffic and packets, on a network link, to avoid filling the link to capacity or overfilling the link, which would result in network congestion and poor performance of the network.

Traffic management is usually implemented as a standalone IC device or as a hardware block within a Network Processor IC or a Communications processor IC. The traffic management device is constructed from flow queue manager (FQM) that stores a plurality of flow queues and the traffic scheduler that controls the sequence of transmission of packets out of FQM. Prior art high performance traffic schedulers are using hardware configurable engines. The functionality of such hardware traffic scheduler is defined via configuration, it is limited by the finite set of all possible configuration combinations, and therefore hardware traffic schedulers are strongly deficient in flexibility. Frequently, the hardware traffic scheduler fails to address relentlessly emerging network operators' requirements when these exceed the set of all possible configurations. To overcome the shortcoming of the hardware traffic scheduler, a more flexible scheduler is required. Flexibility is achieved by software programmability. A software-based traffic scheduler can be programmed for various scheduling algorithms, unique features and can be further safe updated to support new scheduling algorithms. Unfortunately, prior art software-based traffic schedulers, while addressing the generic flexibility demand, so far are failing to achieve the high performance of hardware traffic schedulers.

In order to describe the disclosure in detail, the following terms, abbreviations and notations will be used:
ALU: Arithmetic Logic co-processor Unit
XALU,
X-ALU: Extended Arithmetic Logic co-processor Unit;
MCU: Memory Cluster Unit;
SPE: Scheduling Processor Element;
FQM: Flow Queue Manager;
Mem: Memory;
Node-Cop,
NCOP: Node Co-Processor;
Acc-Cop,
ACOP: Accounting Co-Processor;
VLIW: Very Long Instruction Word;
RISC: Reduced Instruction Set;
CISC: Complex Instruction Set;
ISA: Instruction Set Architecture;
S/W: Software;
H/W: Hardware;
TMU: Traffic Management Unit;
NPU: Network Processor Unit;
SLA: Service Level Agreement;
QoS: Quality of Service;
IC: Integrated Circuit;
WFQ: weighted fair queuing;
WRR: weighted round robin;
MDRR: modified deficit round robin;
SRAM: static random access memory;
DRAM: dynamic random access memory;
GQ: group level;
SQ: subscriber level;
FQ: flow queues level;
DMA: direct memory access;
RX: Receive;
TX: Transmit;
VLAN: Virtual Local Area Network.

SUMMARY

It is the object of the disclosure to provide a traffic scheduler that has the performance of a hardware-based traffic scheduler and the flexibility of a software-based traffic scheduler.

This object is achieved by the features of the independent claims. Further implementation forms are apparent from the dependent claims, the description and the figures.

According to a first aspect, the disclosure relates to a traffic scheduling device for scheduling a transmission sequence of data packets, stored in a plurality of traffic flow queues. The eligibility state of each of the traffic flow queues for the scheduling is maintained in a hierarchical scheduling database describing a relationship among the plurality of traffic flow queues. The traffic scheduling device includes: a plurality of interconnected memory cluster units each of them being associated to a single or more levels of the hierarchical scheduling database and each of them being coupled to at least one co-processors, at least one co-processor being software-programmable to implement a scheduling algorithm; and an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues.

Flexibility of the traffic scheduling device is achieved by software programmability. The software-based traffic scheduling device can be programmed for various scheduling algorithms, unique features and is thus future safe to be updated for supporting new features or scheduling algorithms. The traffic scheduling device is a programmable hierarchical traffic scheduler within a traffic management unit, whose functionality is defined via software, hence it is flexible whereas performance rates equivalent to hardware schedulers are achieved.

BRIEF DESCRIPTION OF THE DRAWINGS

Further embodiments of the disclosure will be described with respect to the following figures, in which.

DETAILED DESCRIPTION OF EMBODIMENTS OF THE DISCLOSURE

Figure 1:
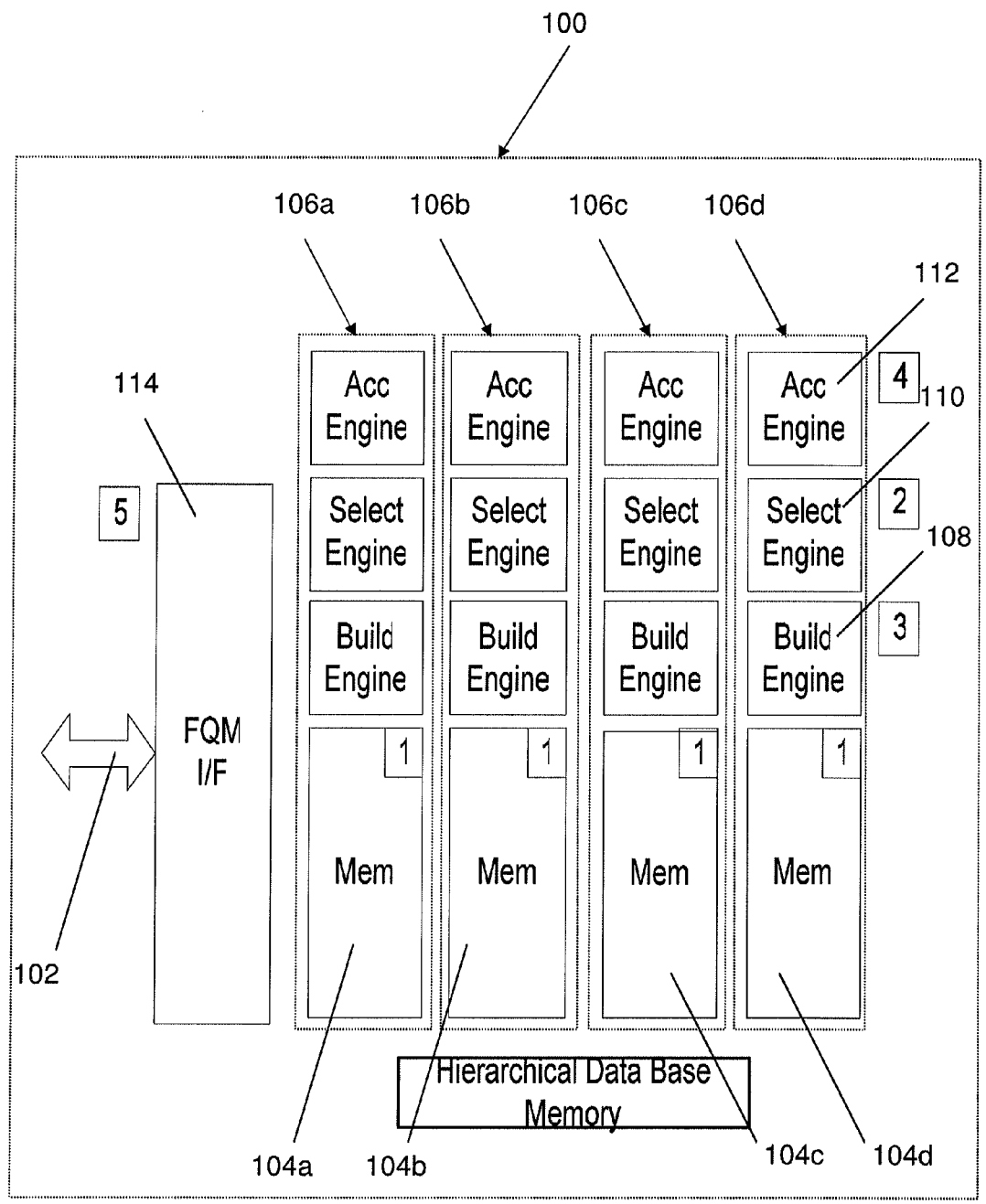
FIG. 1 shows a block diagram of a traffic scheduling device according to an implementation form.

In a first possible implementation form of the traffic scheduling device according to the first aspect, the traffic scheduling device further comprises a management processor configured to construct and maintain the hierarchical scheduling database based on configuration commands of upper layer entities.

Upper layer entities relate to network entities in a hierarchical structured network that are hierarchically located above the traffic management unit, e.g. network routers, network management units, network configuration units and others.

The management processor is optional. It can also be realized by an external processor. When the management processor is realized externally, the chip size for implementing the traffic scheduling device is reduced thereby reducing production costs and thermal dissipation, on the other hand the performance of database maintenance is lowered as compared to on chip management processor.

In a second possible implementation form of the traffic scheduling device according to the first aspect as such or according to the first implementation form of the first aspect, the co-processors are configured to implement an event-driven software architecture.

An event-driven software architecture is a software architecture pattern promoting the production, detection, consumption of, and reaction to events. An event can be defined as "a significant change in state." For example, when a traffic route in a network gets congested, the traffic route's state changes from "available" to "busy." A communications system architecture may treat this state change as an event to be produced, published, detected and consumed by various applications within the architecture. The architectural pattern may be applied by the design and implementation of applications and systems which transmit events among loosely coupled software components and services. An event-driven software architecture may consist of event emitters (or agents) and event consumers (or sinks). Sinks have the responsibility of applying a reaction as soon as an event is presented. The reaction might or might not be completely provided by the sink itself. For instance, the sink might just have the responsibility to filter, transform and forward the event to another component or it might provide a self-contained reaction to such event. The first category of sinks can be based upon traditional components such as message oriented middleware while the second category of sink (self-contained online reaction) might require a more appropriate transactional executive framework. Building applications and systems around an event-driven architecture allows these applications and systems to be constructed in a manner that facilitates more responsiveness, because event-driven systems are, by design, more normalized to unpredictable and asynchronous environments.

The concurrent execution is achieved in two dimensions by processing events independently and by concurrent processing per database layers. The outcome is a deep concurrency (parallelization) of an immense number of independent tasks that are executed on independent processors/co-processors.

In a third possible implementation form of the traffic scheduling device according to the first aspect as such or according to the any of the preceding implementation forms of the first aspect, the hierarchical scheduling database is tree-structured from a root interface of physical ports per physical interface representing a highest level of hierarchy down to the plurality of traffic flow queues representing a lowest level of hierarchy, the hierarchical scheduling database comprising at least one of the following intermediate levels of hierarchy:

a level of sub ports per physical port, a level of subscriber groups per sub port, a level of subscribers per subscriber group, and a level of traffic flow queues per subscriber.

The number of memory cluster units may correspond to the number of hierarchy levels, each memory cluster unit realizing a different hierarchy level. Then, the traffic scheduling device is flexible for changing the number of hierarchy levels by including or removing memory cluster units.

In a fourth possible implementation form of the traffic scheduling device according to the first aspect as such or according to the any of the preceding implementation forms of the first aspect, the scheduling algorithm comprises a select process traversing the hierarchical scheduling database from the root interface towards the plurality of flow queues, at each level of the hierarchical scheduling database choosing members of the hierarchical scheduling database based on their eligibility for scheduling state.

By selecting members of the hierarchical database which are eligible for scheduling, the scheduling algorithm does not work on data which is not eligible. Thus, the efficiency of the scheduling algorithm is improved. The scheduling process is faster than a scheduling process not exploiting the eligibility of the members to be processed.

In a fifth possible implementation form of the traffic scheduling device according to the fourth implementation form of the first aspect, the scheduling algorithm comprises one of the following but is not limited to: a weighted fair queuing (WFQ) algorithm, a weighted round robin (WRR) algorithm, a modified deficit round robin (MDRR) algorithm, a strict priority algorithm, and a first come first serve algorithm.

Such algorithms are standard scheduling algorithms which are easy to implement. The flexible architecture of the traffic scheduling device allows implementing new scheduling algorithms which are not yet developed.

In a sixth possible implementation form of the traffic scheduling device according to the fourth or the fifth implementation forms of the first aspect, the scheduling algorithm comprises a build process traversing the hierarchical scheduling database, in particular but not limited to traversing from the plurality of traffic flow queues towards the root interface, at each level of the hierarchical scheduling database updating the eligibility state of the members of the hierarchical scheduling database.

By updating the eligibility state of the members of the hierarchical scheduling database, the efficiency of the scheduling algorithm is improved as only eligible members are processed and no processing steps have to be performed which are not required as result.

In a seventh possible implementation form of the traffic scheduling device according to the first aspect as such or according to the any of the preceding implementation forms of the first aspect, each of the plurality of memory cluster units or a group of the memory cluster units is coupled to an associated node co-processor configured to process topology mapping information of the hierarchical scheduling database and to process data fields mapping information of nodes of the hierarchical scheduling database.

The associated node co-processor can efficiently process topology information. Message overhead for associating topology information to memory clusters can be saved.

In an eighth possible implementation form of the traffic scheduling device according to the first aspect as such or according to the any of the preceding implementation forms of the first aspect, each of the plurality of memory cluster units or a group of the memory cluster units is coupled to an associated accounting co-processor configured to process shapers, policers and counters related to the scheduling algorithm.

The associated node co-processor can efficiently process shapers, policers and counters which are related to the specific memory cluster. Message overhead for associating shapers, policers and counters to memory clusters can be saved.

In a ninth possible implementation form of the traffic scheduling device according to the first aspect as such or according to the any of the preceding implementation forms of the first aspect, each of the plurality of memory cluster units or a group of the memory cluster units is coupled to an associated Enhanced Arithmetic Logic co-processor Unit performing computing operations on the hierarchical scheduling database.

The coupling provides a high degree of flexibility. Memory conflicts are reduced as memory clusters do not access a single arithmetic logic unit for performing their computing operations.

In a tenth possible implementation form of the traffic scheduling device according to the ninth implementation form of the first aspect, each of the Enhanced Arithmetic Logic co-processor Units comprises a linear systolic array of VLIW processors.

Linear systolic arrays are high performance engines. Their instruction set architecture is optimized for hierarchical scheduling.

In an eleventh possible implementation form of the traffic scheduling device according to the ninth or the tenth implementation forms of the first aspect, the Enhanced Arithmetic Logic co-processor Units are dynamically or statically directly interconnectable with respect to each other for processing the memory cluster units in a pipelined manner with respect to the levels of the hierarchical scheduling database.

Thus, the memory behaviour is identical to the memory behaviour of a pipeline of configurable, non-programmable hardware units as the Enhanced Arithmetic Logic co-processor Units are able to process the memory cluster units in a pipelined manner. This pipelined processing results in a high performance rate which corresponds to the performance of a configurable hardware pipeline while providing full programmability.

In a twelfth possible implementation form of the traffic scheduling device according to the ninth or the tenth implementation forms of the first aspect, the Enhanced Arithmetic Logic co-processor Units are dynamically or statically interconnectable with respect to each other via a shared global collection of Scheduling Processor Elements for processing the memory cluster units in a pipelined manner with respect to the levels of the hierarchical scheduling database, the Scheduling Processor Elements comprising RISC/CISC processors.

Thus, the memory behaviour is identical to the memory behaviour of a pipeline of configurable, non-programmable hardware units as the Enhanced Arithmetic Logic co-processor Units are able to process the memory cluster units in a pipelined manner. The use of a shared collection of Scheduling Processor Elements for interconnecting the memory cluster units provides additional degrees of programmability. Depending on number of hierarchy levels and performance requirements, a different number of SPEs can be used for forming the shared collection. Hence, the SPE processing power can be exploited depending on the workload of the different level of the hierarchical scheduling database. RISC processors can be used for implementing simple processing steps, where a reduced instruction set is sufficient and CISC processors can be used for complex processing steps where a complex instruction set is required.

In a thirteenth possible implementation form of the traffic scheduling device according to the ninth or the tenth implementation forms of the first aspect, the Enhanced Arithmetic Logic co-processor Units are dynamically or statically interconnectable with respect to each other via distributed collections of Scheduling Processor Elements assigned to one or more of the plurality of memory cluster units for processing the memory cluster units in a pipelined manner with respect to the levels of the hierarchical scheduling database, the Scheduling Processor Elements comprising RISC/CISC processors.

Distributed collections or shared collection of Scheduling Processor Elements assigned to the memory cluster units increase the degree of flexibility. The Scheduling Processor Element software may perform a priority remapping in the hierarchical traffic scheduling device. Some of the hierarchy levels may be processed through XALU only while the other hierarchy levels may be processed through XALU and SPE resulting in a still higher degree of flexibility.

In a fourteenth possible implementation form of the traffic scheduling device according to the twelfth or the thirteenth implementation forms of the first aspect, each of the collections either distributed or shared of Scheduling Processor Elements is supervised by a supervising unit.

The supervising unit can be used for implementing different configuration strategies for associating SPEs to memory cluster units improving the flexibility. New scheduling algorithms can be easily implemented as the architecture of the traffic scheduling device is not limited to specific hardware configurations.

The traffic scheduling device may be a programmable hierarchical traffic scheduler within a traffic management unit, whose functionality is defined via software, hence it is flexible whereas performance rates equivalent to hardware schedulers are achieved. The traffic scheduling device can be programmed for various scheduling algorithms and unique features which cannot be achieved by a solely hardware-configurable entity.

Implementation forms of the disclosure can thus provide traffic scheduling with a flexible traffic scheduler which is flexible to further development in the field of algorithms, in particular faster algorithms that can provide at the same time the superior performance of a hardware-based traffic scheduler.

FIG. 1 shows a block diagram of a traffic scheduling device 100 according to an implementation form. The traffic scheduling device 100 is used for scheduling a transmission sequence of data packets which are stored in traffic flow queues 102 indicated by the arrow in FIG. 1. An eligibility state of each of the traffic flow queues 102 for the scheduling is maintained in a hierarchical scheduling database 104 which is formed by the exemplary number of four memories 104a, 104b, 104c and 104d. The number of memories is not limited to four, it can be any other number. The eligibility state describes a relationship among the traffic flow queues 102 based on a QoS service provider's configuration.

The traffic scheduling device 100 comprises an exemplary number of four interconnected memory cluster units 106a, 106b, 106c, 106d. The number of memory cluster units is not limited to four, it can be any other number. Each of the memory cluster units 106a, 106b, 106c, 106d is associated to a single or more levels of the hierarchical scheduling database 104, which will be explained below with respect to FIG. 3 and coupled to an exemplary number of three co-processors 108, 110, 112. The number of coupled co-processors is not limited to three, it can be any other number. The co-processors 108, 110, 112 are software-programmable for implementing a scheduling algorithm. The tasks of Accounting, Select, Build associated with the co-processors 108, 110, 112 in FIG. 1 are exemplary of a scheduling algorithm, the software may implement another scheme, for example Select task and Build task are implemented on a single coprocessor.

In an alternative implementation form, a blend of software programmable co-processors and hardware configurable co-processors is used, wherein at least one co-processor is software programmable.

The traffic scheduling device 100 further comprises an interface 114 to the traffic flow queues 102 which is used for identifying one or more packets associated to a particular traffic flow queue 102 selected for transmission according to the scheduling algorithm. The interface 114 signals the eligibility state of each of the traffic flow queues 102 to the traffic scheduling device 100.

A traffic management unit 200 as described below with respect to FIG. 2 can be used to manage limited resources such as bandwidth on a transmission line from a network router. In the event of outgoing traffic queuing due to insufficient bandwidth, all other queues can be halted or throttled to send the traffic from the highest priority queue upon arrival. This ensures that the prioritized traffic, such as real-time traffic, e.g. an RTP stream of VoIP connection, is forwarded with the least delay and the least likelihood of being rejected due to a queue reaching its maximum capacity. All other traffic can be handled when the highest priority queue is empty. Another approach which can be used by the traffic management unit 200 is to send disproportionately more traffic from higher priority queues than for medium or lower priority queues.

The traffic scheduling device 100 can access the traffic flow queues 102 by using the interface 114. Packets of specific traffic flow queues 102 can be identified based on their header field, e.g. by its port number, source address or destination address or by its packet identifier stored in the header field. An eligibility state is associated to each of the traffic flow queues 102. The eligibility state can be seen describing a right of the respective traffic flow queue to be forwarded. The eligibility state is thus related to priority of the respective flow queue 102 and depends on a service provider's quality of service (QoS) configuration. The eligibility state indicates if a traffic flow queue 102 is available to be scheduled by the traffic scheduling device 100. When the eligibility state of a traffic flow queue 102 is "not available" the traffic scheduling device 100 will not consider that queue in its scheduling decision. When the eligibility state of a traffic flow queue 102 is "available" the traffic scheduling device 100 will consider that queue when deciding which traffic flow queue 102 is next to be forwarded. The service provider guarantees a certain level of performance to a traffic flow by using the service provider's QoS concept. Quality of Service is the ability to provide different priority to different applications, users, or data flows, or to guarantee a certain level of performance to a data flow. For example, a required bit rate, delay, jitter, packet dropping probability and/or bit error rate may be guaranteed in a traffic contract. Quality of service guarantees are important if the network capacity is insufficient, especially for real-time streaming multimedia applications such as voice over IP, online games and IP-TV, since these often require fixed bit rate and are delay sensitive, and in networks where the capacity is a limited resource, for example in cellular data communication.

Each of the memory cluster units 106a, 106b, 106c and 106d comprises a select engine 110, a build engine 108 and an accounting engine 112. The select engine 110 is a programmable, high flexible high performance machine which is used for implementing a select process of the scheduling algorithm to select next flow queue packets to be transmitted. The select process is used for traversing the hierarchical scheduling database 104 and for choosing members at each level of the database 104 members based on their eligibility state. The build engine 108 is a programmable, high flexible high performance machine which is used for implementing a build process of the scheduling algorithm. The build process is used for traversing the hierarchical scheduling database 104 and for updating at each level of the database 104 the eligibility state of their members. The accounting engine 112 is a programmable, high flexible high performance machine which is used for implementing an accounting process of the scheduling algorithm. The accounting process is used for processing shapers, policers and counters of the hierarchical scheduling database 104 related to the scheduling algorithm.

Shapers or traffic shapers are used to optimize or guarantee performance, improve latency and/or increase usable bandwidth for some kinds of packets by delaying other kinds of packets that meet certain criteria. If a link becomes saturated to the point where there is a significant level of contention, latency can rise substantially. As a result, traffic shaping is used to prevent this from occurring and keep latency in check. Traffic shaping provides a means to control the volume of traffic being sent into a network in a specified period. The processing of traffic shapers, e.g. configuration of performance, latency and bandwidth to be applied for the shaping process is performed by the accounting process.

Policers or traffic policers are used to perform traffic policing which is the distinct but related practice of packet dropping and packet marking. Traffic policing includes the technique of selecting or categorizing traffic into different types or classes which is also denoted as traffic classification. The processing of traffic policers, e.g. configuration of the marking process or categorization the packets is performed by the accounting process.

Counters are used for inspecting internal states, parameters or variables of the traffic management unit or the traffic scheduling unit. They provide an insight of the actual or past performance of the traffic scheduling process. The processing of the counters, e.g. configuration or reading of counters, is performed by the accounting process.

Thus, the subunits of the traffic scheduling device 100 are

1. Hierarchical memory database 104 or hierarchical scheduling database 104 which holds the hierarchy data. The hierarchical memory database 104 is typically partitioned to several memory banks 104a, 104b, 104c and 104d matching the number of hierarchical levels. In FIG. 1, an exemplary number of four hierarchical levels are depicted.

2. Programmable select engines 110 that execute a scheduling process over the hierarchical database 104 or hierarchical scheduling database 104 for selecting the next flow queue packets to be transmitted. Typically, select engines 110 are partitioned to several pipeline units attached to memory banks 104a, 104b, 104c, 104d matching the number of hierarchical levels. Examples of select algorithms are WFQ and MDRR.

3. Programmable build engines 108 that execute a build process over the hierarchical database 104. The build process maintains the eligibility state of the database members. Typically, build engines 108 are partitioned to several pipeline units attached to memory banks 104a, 104b, 104c, 104d matching the number of hierarchical levels.

4. Programmable accounting engines 112 that update the values of scheduling counters like MDRR's deficit counters and hierarchical shapers. Typically, accounting engines 112 are partitioned to several pipeline units attached to memory banks 104a, 104b, 104c, 104d matching the number of hierarchical levels.

5. Flow Queue Manager Interface (FQM i/f) or simply called interface 114. The traffic scheduling device 100 accepts flow queue state messages from the FQM interface 114, e.g. Enq(i) message indicating that the flow queue (i) became not empty. The traffic scheduling device 100 sends a select (i) message to the FQM interface 114 indicating the interface 114 to send a packet from Flow Queue (i).

Flexibility of the traffic scheduling device 100 is achieved by software programmability. The software-based traffic scheduling device 100 can be programmed for various scheduling algorithms, unique features and is thus future safe to be updated for supporting new features or scheduling algorithms. The traffic scheduling device 100 is a programmable hierarchical traffic scheduler within a traffic management unit, whose functionality is defined via software, hence it is flexible whereas performance rates equivalent to hardware schedulers are achieved.

Figure 2:
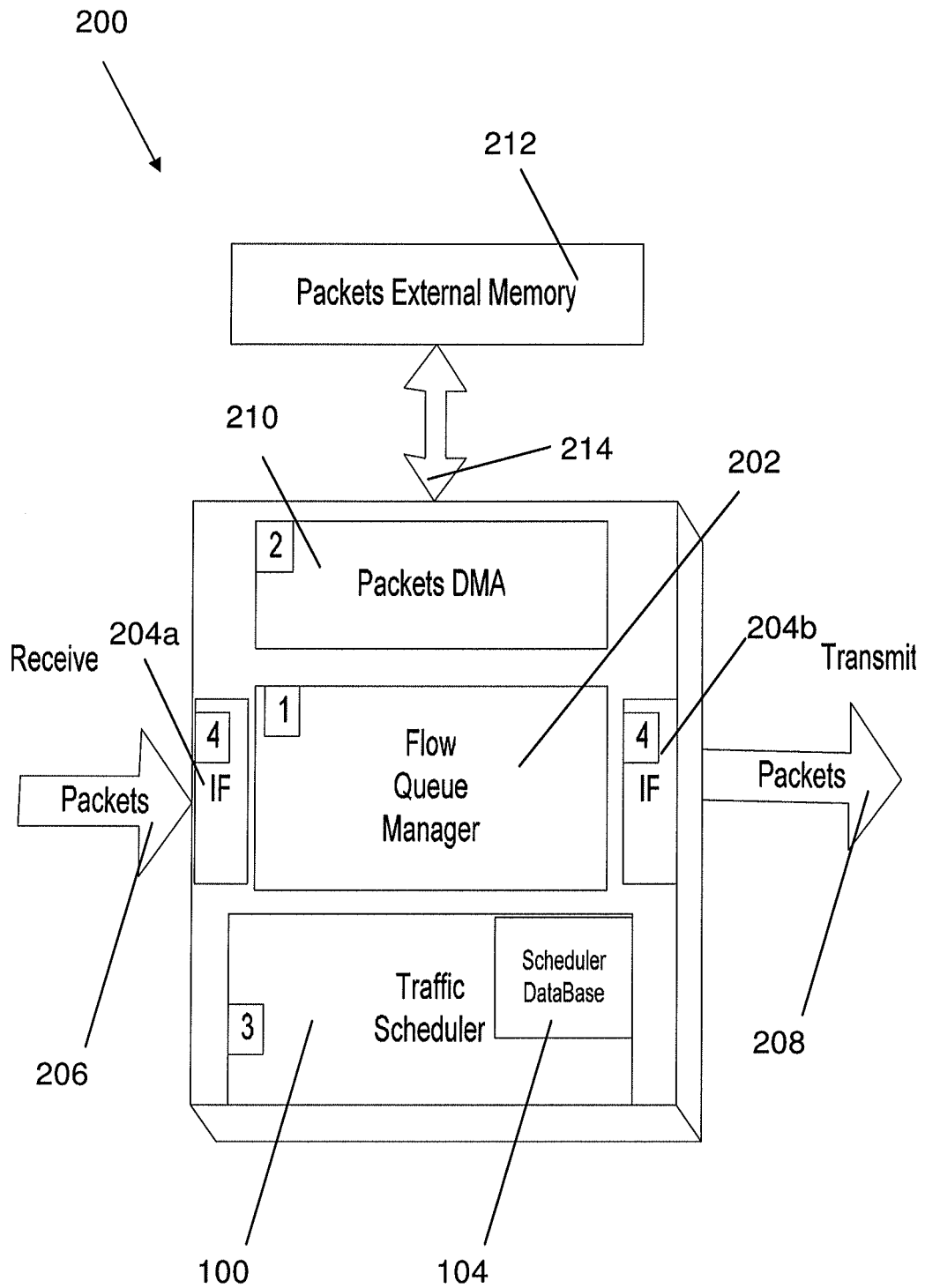
FIG. 2 shows a block diagram of a traffic management unit with a traffic scheduling device according to an implementation form.

FIG. 2 shows a block diagram of a traffic management unit (TMU) 200 with a traffic scheduling device 100 according to an implementation form. The traffic management unit 200 comprises a traffic scheduling device 100 with a hierarchical scheduling database 104 according to the description of FIG. 1, a flow queue manager 202 for providing a system of flow queues, an RX interface 204a to receiving (RX) packets 206, a TX interface 204b to transmitting (TX) packets 208 and a DMA (direct memory access) unit 210 with a DMA interface 214 to a packets external memory 212. The FQM interface 114 depicted in FIG. 1 corresponds to the interface to the flow queue manager 202 of FIG. 2.

Thus, the traffic management subunits are the following:

1. Flow Queue manager 202 that implements a hierarchical queuing system of flow queues, typically via packet descriptors. A typical number of queues is 1 K to 1 Million structured in 5-7 levels of hierarchy, but it may be any other number of queues structured in any number of levels of hierarchy.

2. Packets DMA 210 that receives and transmits packets into/from packets external memory 212 or an alternative internal, i.e. on die, packet memory.

3. Traffic scheduling device 100 or Traffic Scheduler that controls the sequence of transmission of packets out of the flow queues. The scheduling methods comprise various algorithms like WFQ, WRR, MDRR, strict priority and others. The hierarchical scheduling database 104 is stored in a database memory, that may be either internal (on IC's die) or external memory (SRAM, DRAM). The performance, i.e. throughput, of the traffic scheduling device 100 is measured in Mega Packets Per Second (MPPS).

A prior stage, to traffic management unit 200 classifies and tags traffic into flows. For example this prior stage may be a Network Processor Unit (NPU). Flow may be defined by some inner packet fields like VLANs, DiffServ or TCP/IP five tuple.

The traffic management unit 200 implements a per flow queuing system, also known as flow queues. For high number of flow queues, for example from 1 K to 1 M, a hierarchical scheduling model is used. The model organizes flow queues into group of subscribers, subscribers groups and so on up to physical interfaces which will be explained in more detail below with respect to FIG. 3.

TMU's 200 received packets 206 are tagged with flow queue identification (id tag). The TMU 200 operation comprises the following steps:

1. Receive—packets 206 are stored into right flow queue by means of id tag.

2. Schedule—based on service provider's QoS configuration scheme among all flow queues, flow queue packets are scheduled for transmission.

3. Transmit—packets 208 are send out

Figure 3:
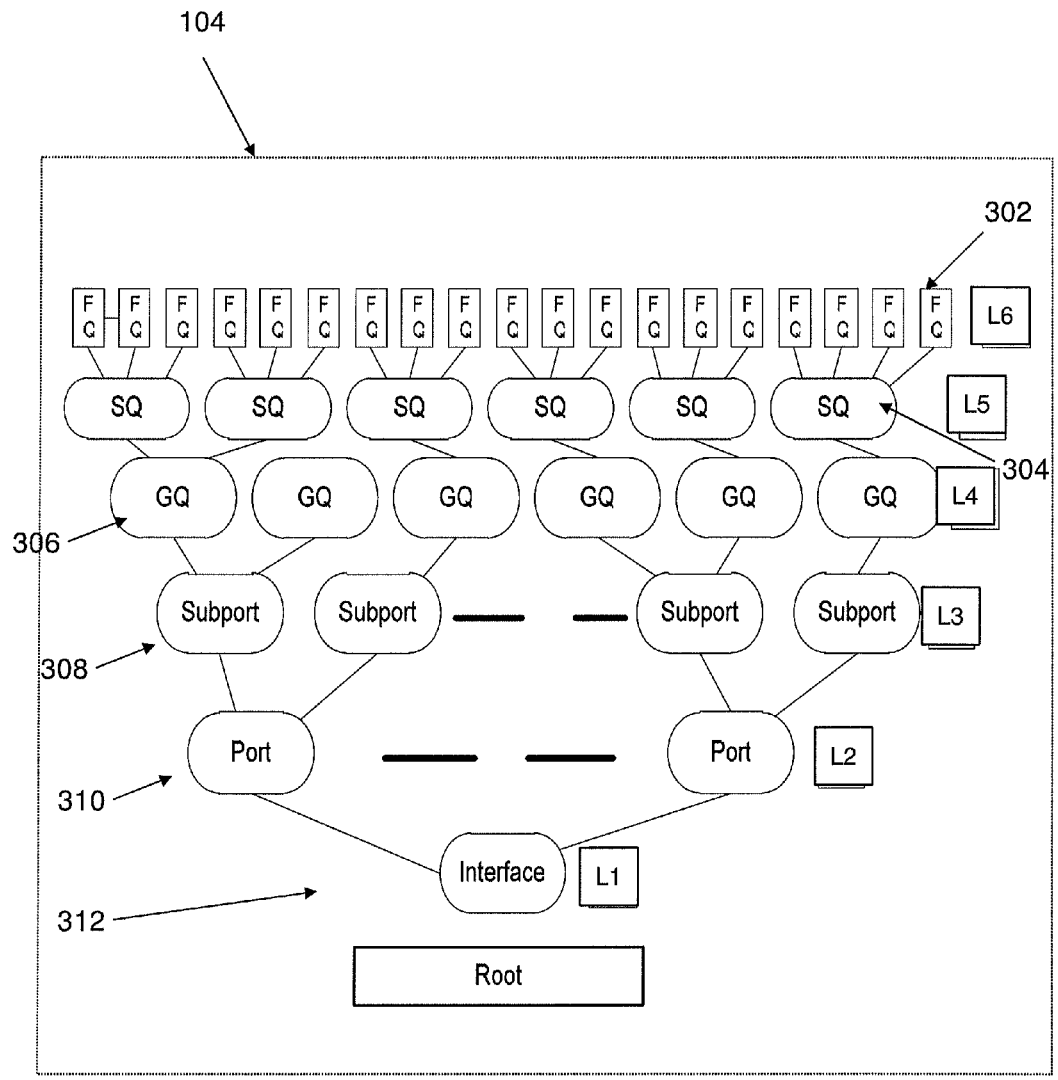
FIG. 3 shows a schematic diagram of a hierarchical scheduling database according to an implementation form.

FIG. 3 shows a schematic diagram of a hierarchical scheduling database 104 according to an implementation form.

The database 104 is constructed from several hierarchy levels, where FIG. 3 depicts an exemplary number of six hierarchy levels L1, L2, L3, L4, L5 and L6. The database, however, may have any other number of hierarchy levels.

L1 Root Interface Level—All available physical ports 310 within a physical interface 312. An exemplary number is 64 but can be any other number.

L2 Port Level—All available sub-ports 308 per physical port 310. An exemplary number is 128 but can be any other number.

L3 Sub Port level—All available subscribers groups 306 per sub-port 308. An exemplary number is 4 K (=4000) but can be any other number.

L4 Group level (GQ)—All available subscribers 304 per subscribers group 306. An exemplary number is 64 K (=64000) but can be any other number.

L5 Subscriber level (SQ)—All available Flow Queues 302 per subscriber 304. An exemplary number is 16 but can be any other number.

L6 Flow Queues level (FQ)—Sum of total available Flow Queues 302. An exemplary number is 1 M (=1,000,000) but can be any other number.

Figure 4:
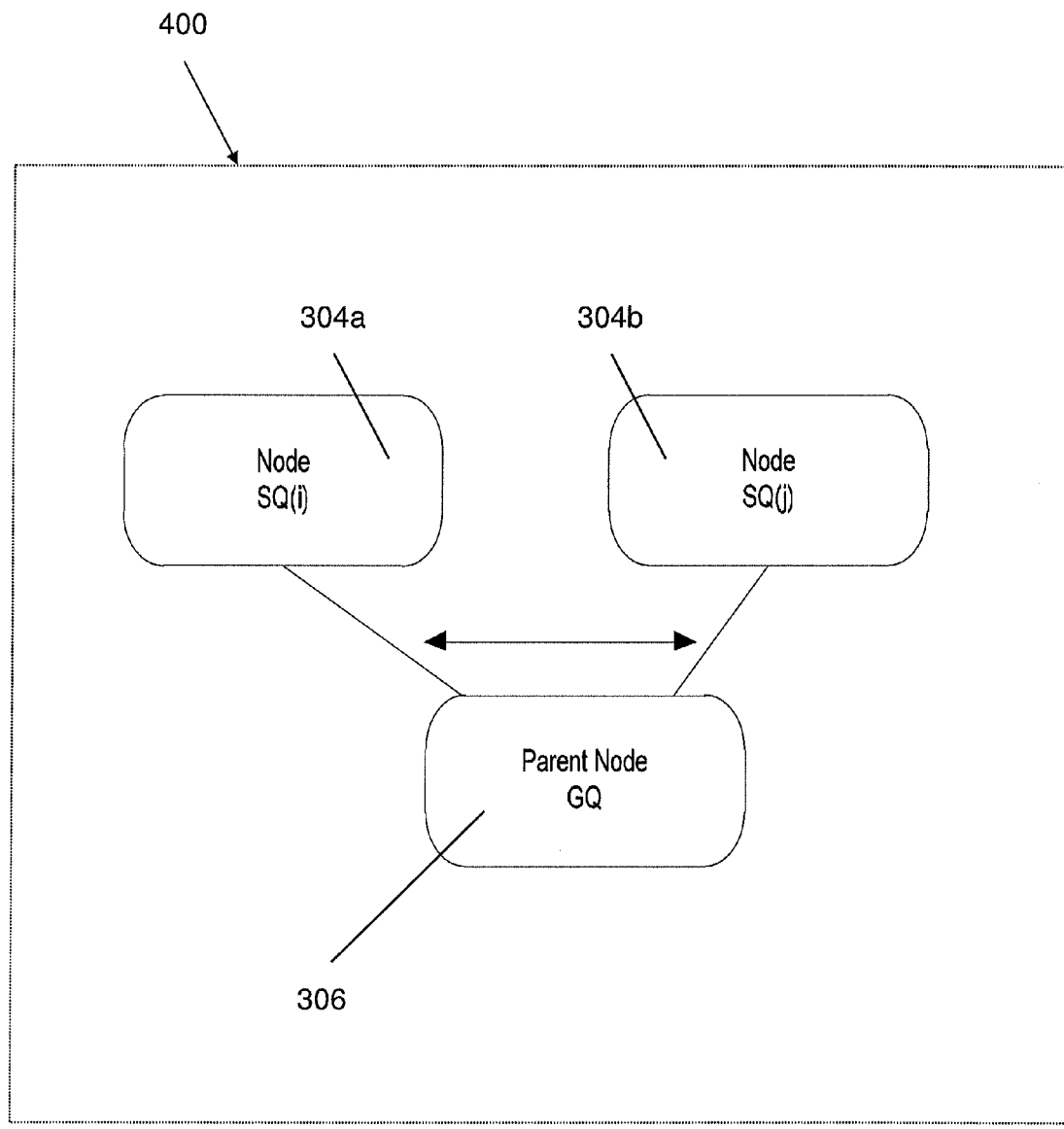
FIG. 4 shows a schematic diagram of a basic element of the hierarchical scheduling database depicted in FIG. 3.

FIG. 3 shows the hierarchical scheduling database 104 being represented in a tree structure. A basic element is a node with associated members also called children. FIG. 4 shows a schematic diagram of an exemplary basic element of the hierarchical scheduling database 104. The exemplary parent node represents the subscriber group (GQ) 306. The children are subscribers (SQ) members 304a and 304b of the parent GQ group 306.

A typical node's data includes—
Per child state information
Node state information
Pointers to deficit counters
Pointer to shapers
Software defined information Two main processes exploit the scheduling hierarchical database 104, the select process running on the select engine 110 as described with respect to FIG. 1 and the build process running on the build engine 108 as described with respect to FIG. 1. The select process is a consumer of the database 104. The build process is the producer of the database 104. Scheduling algorithms like WFQ and MDRR are work conserving, meaning the bandwidth is allocated only to active queues. The term queue is generalized to a member within the hierarchical database 104 e.g. a subscriber 304. The term active is generalized to an eligible for scheduling (selection). In other words the select process chooses only eligible members in all the hierarchical levels. In the interface 312 level L1 it is all the eligible ports 310, in the port 310 level L2 it is all the eligible sub-ports 308, in the sub-port 308 level L3 it is all the eligible groups 306, in the group 306 level L4 it is all the eligible subscribers 304 and in the subscriber 304 level L5 it is all the eligible flow queues 302.

The select process traverses the database 104 in the direction from the root 312 towards the flow queue 302, at each level applying scheduling algorithms like MDRR, WFQ, Strict Priority, etc.

The eligibility state associated to each of the traffic flow queues 102 indicates the eligibility for processing a specific flow queue. The eligibility state of a member of the hierarchical scheduling database 104, also called eligibility for processing state of that member, indicates the eligibility of a member of the database to be processed by the scheduling algorithms. Members of the database 104 are interfaces, ports, subports, subscriber groups, subscribers and flow queues. The eligibility state of a member of the hierarchical scheduling database 104 may be configured by the service provider according to its QoS contract. For example, some ports (or subports) may have a higher priority than others due to their configuration for real-time traffic while other ports (or subports) have a low priority due to their configuration for non-real-time traffic, e.g. such as file transfer applications.

The selection process steps are
1. Select one of the eligible ports 310 out of the interface 312 level L1,
2. Select one of the eligible sub-ports 308 out of the port 310 selected in step 1,
3. Select one of the eligible subscribers groups 306 out of the sub-port 308 selected in step 2,
4. Select one of the eligible subscribers 304 out of the subscriber group 306 selected in step 3,
5. Select one of the eligible flow queues 302 out of the subscriber 304 selected in step 4.

Build processes traverses the database 104 in the direction from flow queue 302 towards the root 312. The build processes continuously update the eligibility state of the members within the hierarchical database 104.

The build process is invoked for example due to the following events:
Flows Queue State messages—Empty, Not Empty,
Flow Control Messages—Port Open/Closed,
Build following Select—Update the values Deficit Counters and Shapers based on the selection size,
Shaper Change State—Shaper Colour Change e.g. from Red to Green,
Deficit Counter State Change,
And others.

The Shaper is an element that qualifies a member's obtainable bandwidth by using a colour scheme. For example, this behaviour is defined as follows:
Green—a member is eligible for selection among all other green members,
Yellow—a member is eligible for selection among all other yellow members only if no green members are present,
Red—a member is not eligible for selection.

The Deficit Counter is a counter associated to each member in the MDRR scheduler that measures its proportional bandwidth usage during selection cycle.

The following example is used for illustrating the build process:
1. Enq (i) message received from FQM 202—Flow Queue (i) became not empty.
2. Build updates eligibility at FQ level L6. Now eligibility may be propagated (if needed) to all others levels L5, L4, L3, L2 and L1 in the direction of root 312.
3. If not already eligible build updates eligibility at SQ 304 level L5.
4. If not already eligible build updates eligibility at GQ 306 level L4.
5. If not already eligible build updates eligibility at sub-port 308 level L3.
6. If not already eligible build updates eligibility at port 310 level L2.
7. If not already eligible build updates eligibility at root 312 level L1.

Figure 5:
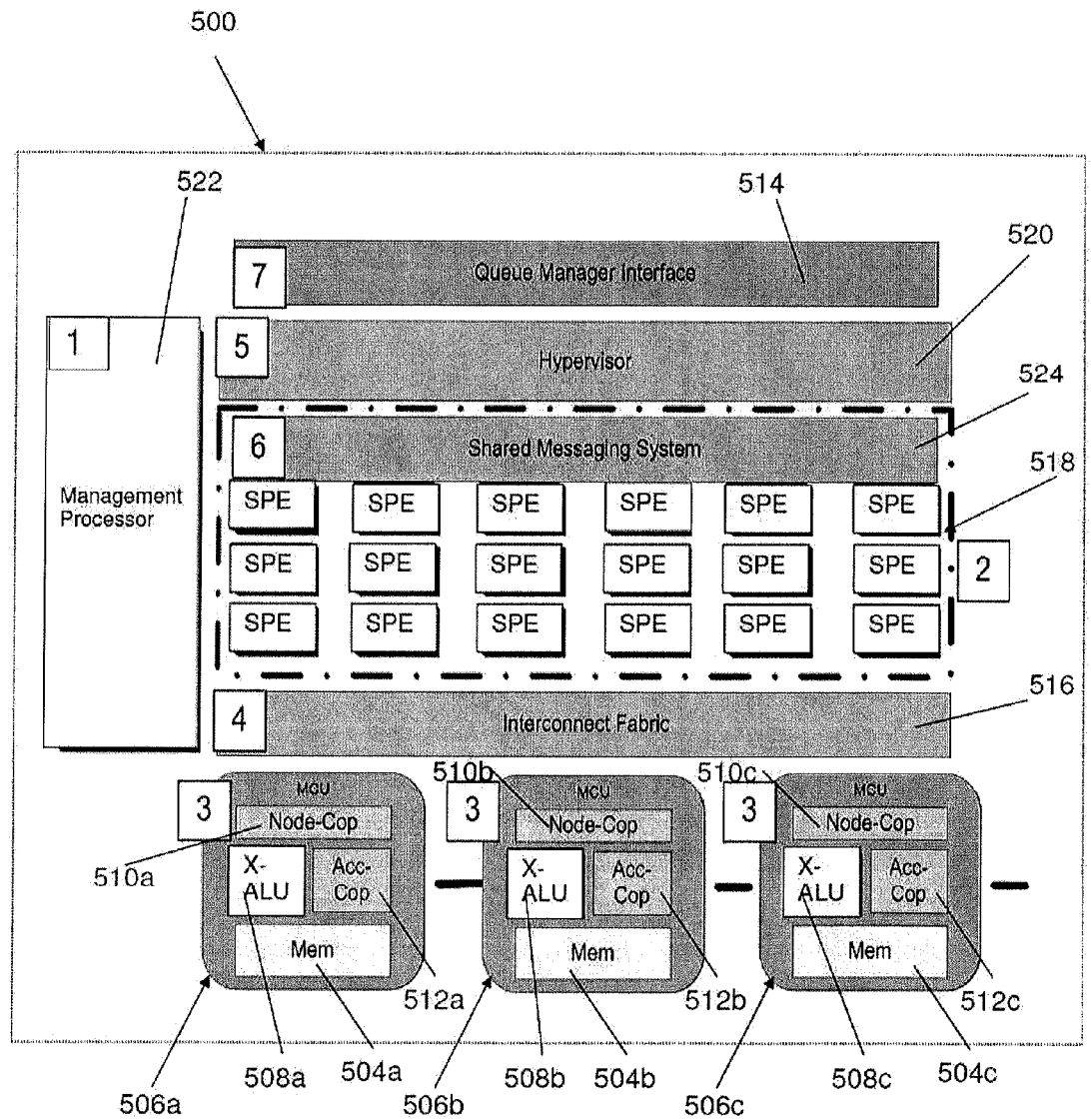
FIG. 5 shows a block diagram of a traffic scheduling device according to an implementation form.

FIG. 5 shows a block diagram of a traffic scheduling device 500 according to an implementation form. The traffic scheduling device 500 comprises an exemplary number of three (which may be any other number of) memory cluster units 506a, 506b, 506c, each of them comprising a node co-processor 510a, 510b, 510c, an X-ALU 508a, 508b, 508c, an accounting co-processor 512a, 512b, 512c and a memory 504a, 504b, 504c. The traffic scheduling device 500 further comprises an interconnect fabric 516 for interconnecting the memory cluster units 506a, 506b, 506c, a group of scheduling processor elements 518 to be used by the memory cluster units 506a, 506b, 506c, a shared messaging system 524 for providing an optional fast messaging between the scheduling processor elements 518, a hypervisor, i.e. a supervising unit 520 for supervising allocation of scheduling processor elements 518 to memory cluster units 506a, 506b, 506c, a queue manager interface 514 forming the interface to a flow queue manager 202 as described with respect to FIG. 2 and an optional management processor 522 for configuring and maintaining the hierarchical scheduling database which is formed by the memories 504a, 504b and 504c.

Thus, the subunits of the traffic scheduling device 500 are:

1. the optional Management Processor 522 which may be implemented as a Standard RISC and which is used to configure and to maintain the hierarchical database. The Management Processor 522 receives member—setup, add, teardown, modify commands from an upper layer management entity.

2. the SPE—Scheduling Processor Elements 518 which are a cluster of parallel tiny RISC units for executing build and select software tasks.

3. the Memory—a set of Memory Cluster Units 506a, 506b, 506c. Each MCU 506a, 506b, 506c is associated with a hierarchical database level, i.e. one of levels L1, L2, L3, L4, L5, L6 as described with respect to FIG. 3. Each MCU 506a, 506b, 506c contains a memory repository 504a, 504b, 504c which may be built of several physical memories and associated tightly coupled co-processors units 508a, 508b, 508c, 510a, 510b, 510c, 512a, 512b, 512c.

4. Interconnect Fabric 516—Connects between SPEs cluster 518 to MCUs 506a, 506b, 506c.

5. Hypervisor 520—Assigns computational tasks build and select procedures to SPEs cluster 518.

6. Shared Messaging System 524—Optional Fast Messaging between SPEs 518

7. Queue Manager Interface 514

Three types of coprocessor are introduced within each MCU 506a, 506b, 506c. The coprocessors are tightly coupled to a memory 504a, 504b and 504c within the MCU 506a, 506b, 506c. This method of affinity ensures coherency and atomicity of the database.

The node co-processor (NCOP) 510a, 510b, 510c incorporates

Database topology mapping information,

Data fields mapping information—node's internal data field's structure.

The software executed by SPE 518 uses logical (virtual) references.

Logical references may be—

Database topology type—pointer reference to a data structure for example pointer to a node, deficit counter or shaper, Data type reference—data ID reference to a field within a data structure, e.g. node status bits.

The Node Coprocessor 510a, 510b, 510c translates logical references to actual memory physical references (and vice versa physical to logical) using either topology mapping or data fields mapping. Implementation may be a programmable or a hardware configurable engine.

The Accounting Co-processor (ACOP) 512a, 512b, 512c calculates the values of general counters, scheduler counters like MDRR deficit, and shapers. Implementation may be programmable or a hardware configurable engine.

The Extended ALU (XALU) 508a, 508b, 508c is a programmable VLIW systolic array. XALU 508a, 508b, 508c performs tightly coupled operations on the database memory 504a, 504b and 504c. The XALU 508a, 508b, 508c receives tasks and/or sends results either from or to SPEs 518, other XALUs 508a, 508b, 508c (or itself via loopback invocation), NCOP 510a, 510b, 510c and ACOP 512a, 512b, 512c.

According to another implementation form, an architecture of the traffic scheduling device 500 is provided where the management processor 522 is excluded, in other words an external processor is used to execute the internal management processor 522 tasks. The traffic scheduling device 500 with or without management processor 522 can be implemented on a single chip.

Figure 6:
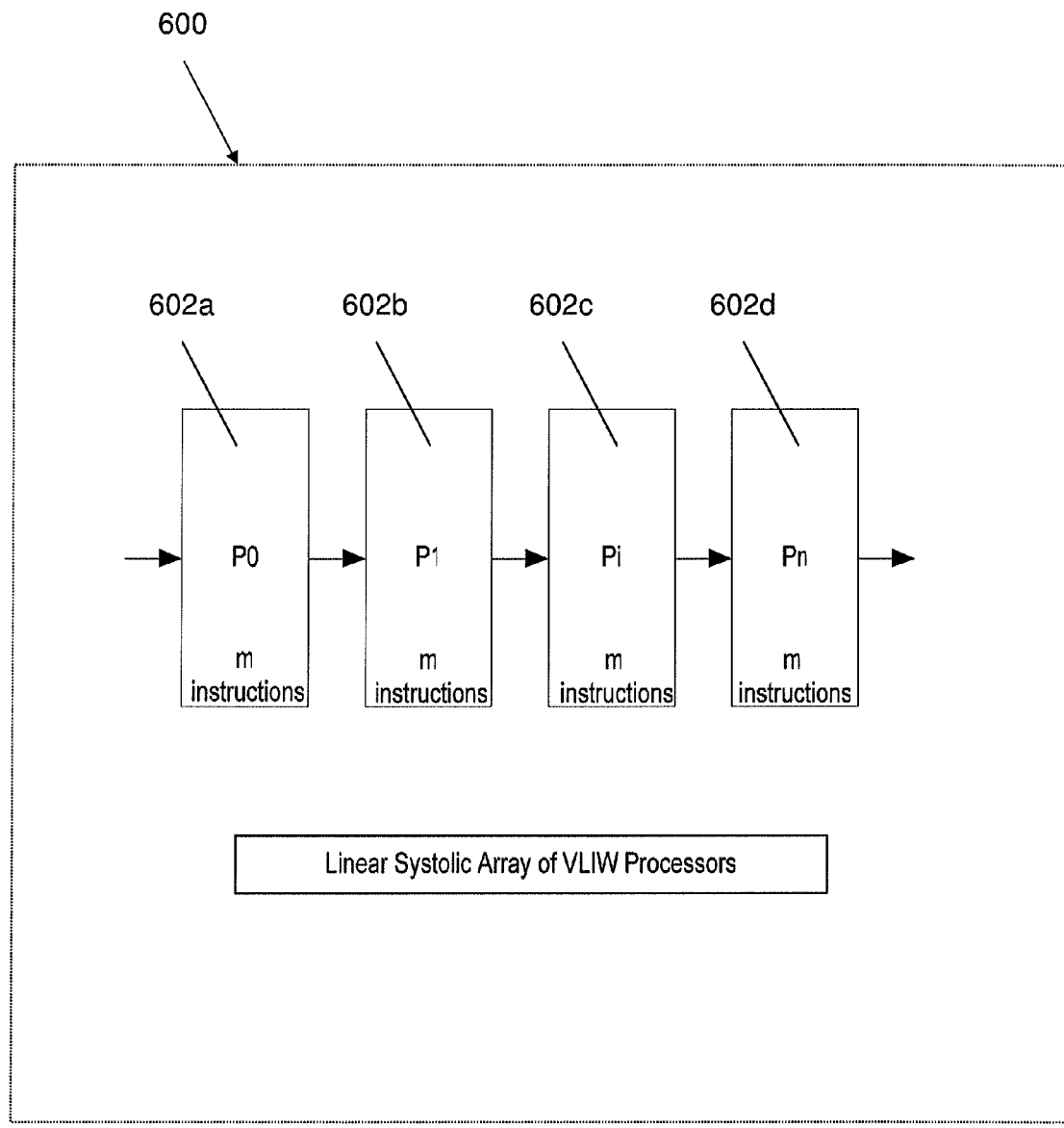
FIG. 6 shows a block diagram of an XALU according to an implementation form.

FIG. 6 shows a block diagram of an XALU 600 according to an implementation form. The XALU 600 is implemented as a linear systolic array of an exemplary number of four VLIW processors P0 602a, P1 602b, P2 602c, P3 602d, P4 602d. However, any other number than four can be used. A systolic array is a well known computer architecture structure. It is composed of a linear pipeline of N processors P0 602a, P1 602b, P2 602c, P3 602d, P4 602d. Each processor executes m instructions in a cycle (VLIW), as a result every cycle a new program of size N times m completes execution.

Systolic arrays are considered as high performance engines yet with a reduced flexibility compared to standard RISC due to a unidirectional flow through architecture structure.

The ISA (Instruction Set Architecture) of XALU 600 is optimized for hierarchical scheduling.

Figure 7:
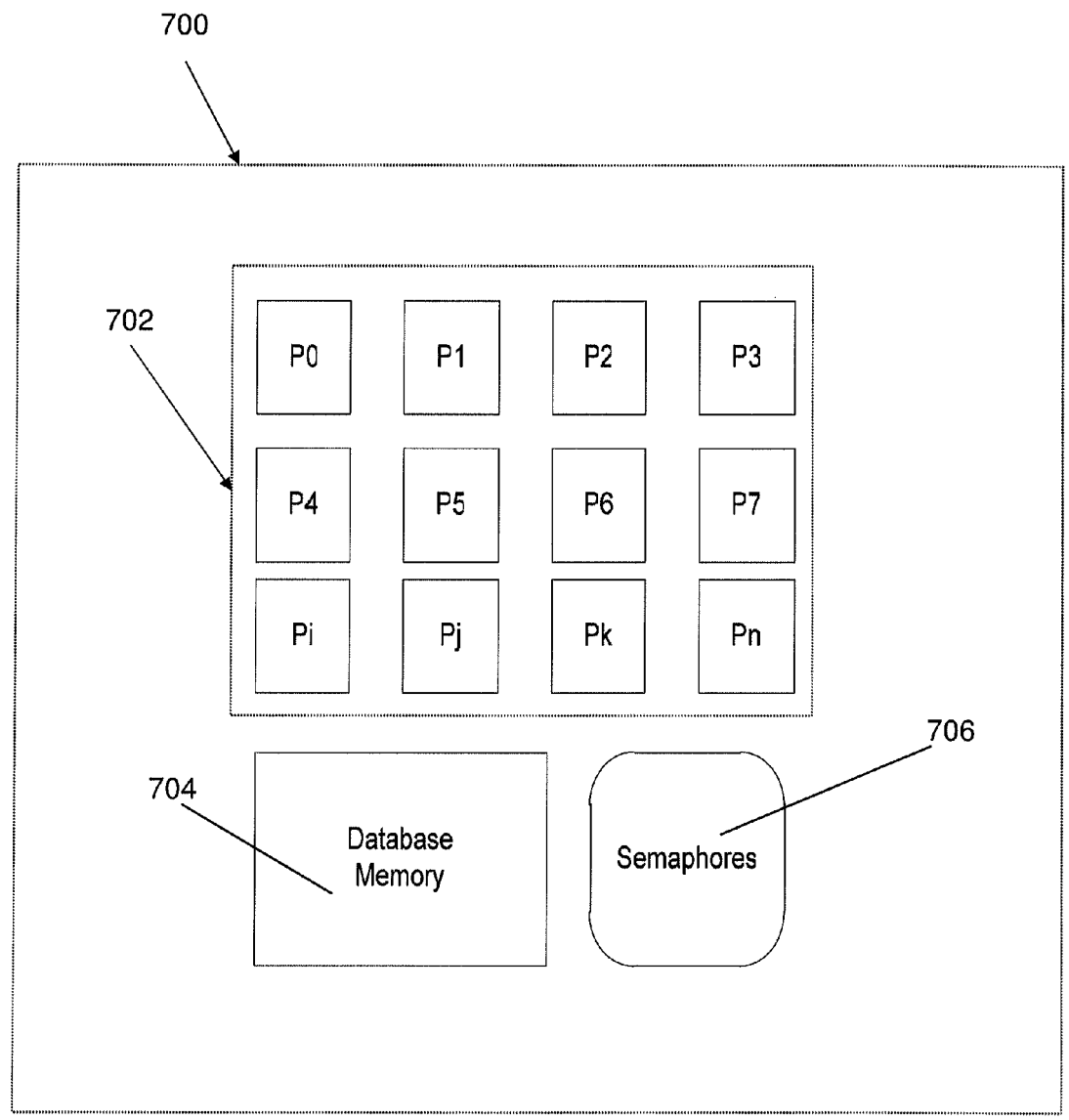
FIG. 7 shows a schematic diagram of a database memory being updated in parallel by multiple processors.

FIG. 7 shows a schematic diagram of a database memory 704 being updated in parallel by multiple processors 702.

A typical method to achieve high performance using programmable engine is via parallelization. The software task is divided, for example, to N parallel tasks that are executed independently on N parallel programmable engines 702. In the case of parallelization, Amdahl's law states that if P is the proportion of a program that can be made parallel (i.e. benefit from parallelization), and (1−P) is the proportion that cannot be parallelized (remains serial), then the maximum speed up that can be achieved by using N processors is:

$$1/((1-P)+P/N).$$

When full parallel independence is possible—P equals to 1. Then the speedup of the software task by using N processors is N.

The method of parallelism speedup fails in case of scheduling database manipulation due to coherency performance impact as illustrated in FIG. 7. The coherency problem occurs due to multiple master update if a processor P(i) updates a data record within the single database 704 while another processor P(j) updates the same data record. To avoid this coherency contention mechanisms like semaphores 706 are used, which unfortunately cause serial behaviour.

The following example illustrates this serial behaviour:

Processor P(i) grabs semaphore 706
Processor P(j) waits for semaphore 706
Processor P(i) updates database 704
Processor P(i) releases semaphore 706
Processor P(j) grabs semaphore 706
Processor P(j) updates database 704
Processor P(i) releases semaphore 706

The result is that processor P(j) updated the database 704 only after processor P(i) finished its update hence parallelization is lost.

Figure 8:
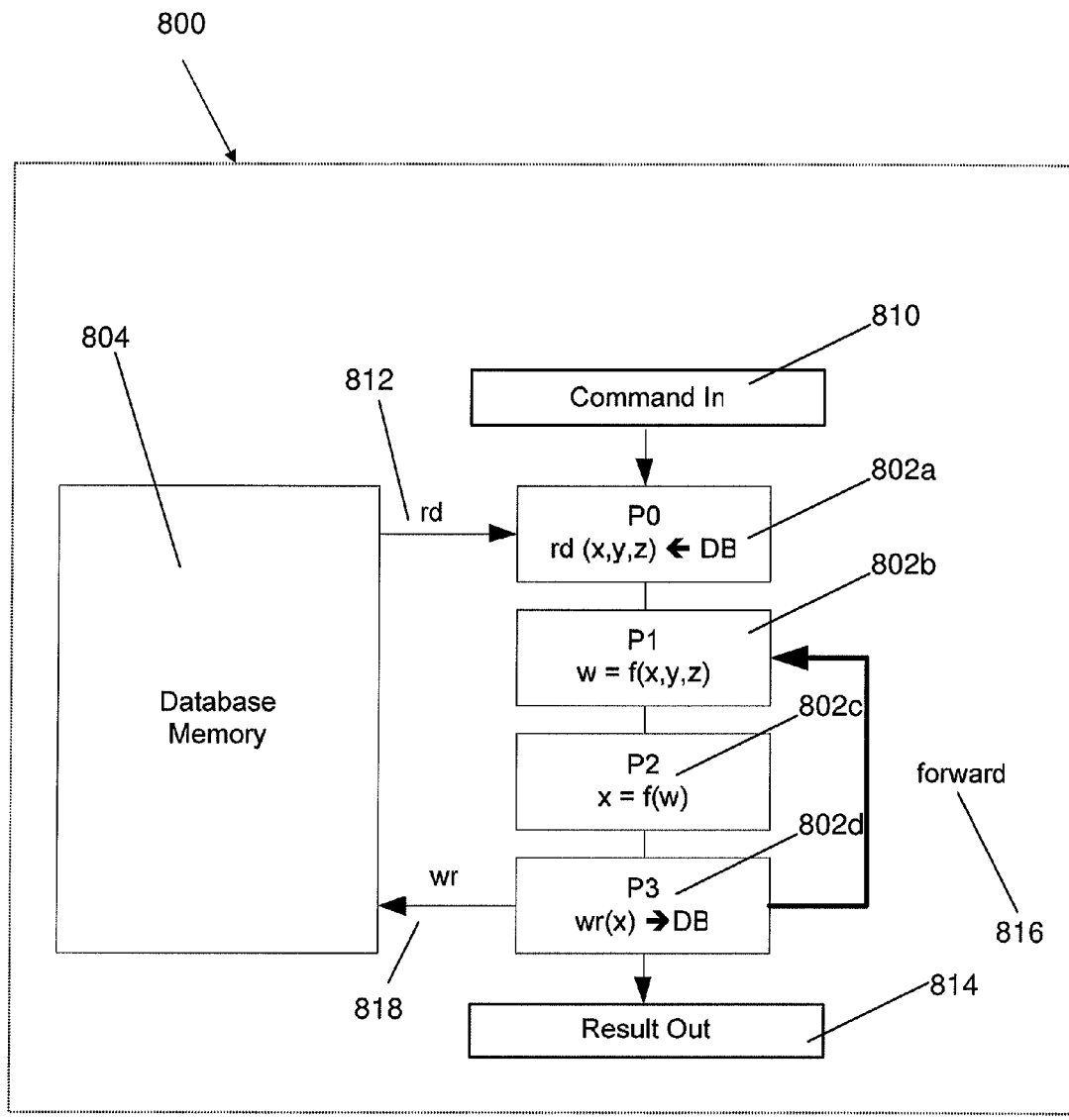
FIG. 8 shows a schematic diagram of a database memory being updated by a systolic array of processors according to an implementation form.

FIG. 8 shows a schematic diagram of a systolic array implementation 800 for updating a database memory 804 by a systolic array of processors P1, P2, P3 and P4 according to an implementation form. A command 810 is input to the systolic array at stage P0 802a, a result 814 is output from the systolic array at stage P3 802d and forwarded from stage P3 802d to stage P1 802b.

Update of the database memory 804 is handled by a single systolic array structure. The performance rate is high due to the systolic array structure, the program completes each cycle with the maximum possible rate. The coherency issue of multiple masters is eliminated due to single master update.

In the systolic array depicted in FIG. 5 a data dependency problem is resolved by using a well known design method of data forwarding. Data dependency occurs if the program (i) modifies a database record, while a subsequent program (i+1) needs this most updated database record.

In the implementation form illustrated in FIG. 8 the following exemplary number of four stages 802a, 802b, 802c, 802d (but any other number of stages is possible) are processed:

Stage P0 802a reads three variables x, y, z from the database memory 804,

Stage P1 802b calculates the new variable w based on x, y, z,

Stage P2 802c calculates x based on w,

Stage P3 802d writes x into database memory 804.

Stage P0 802a reads X value from the database 804, but stage P3 802d contains a more updated value of X. The solution to this type of data dependency is by using a well known design method of data forwarding. The most updated database value of X is forwarded from P3 stage 802d to P1 stage 802b invalidating the value read by P0. The systolic array's high performance is maintained.

Figure 9:
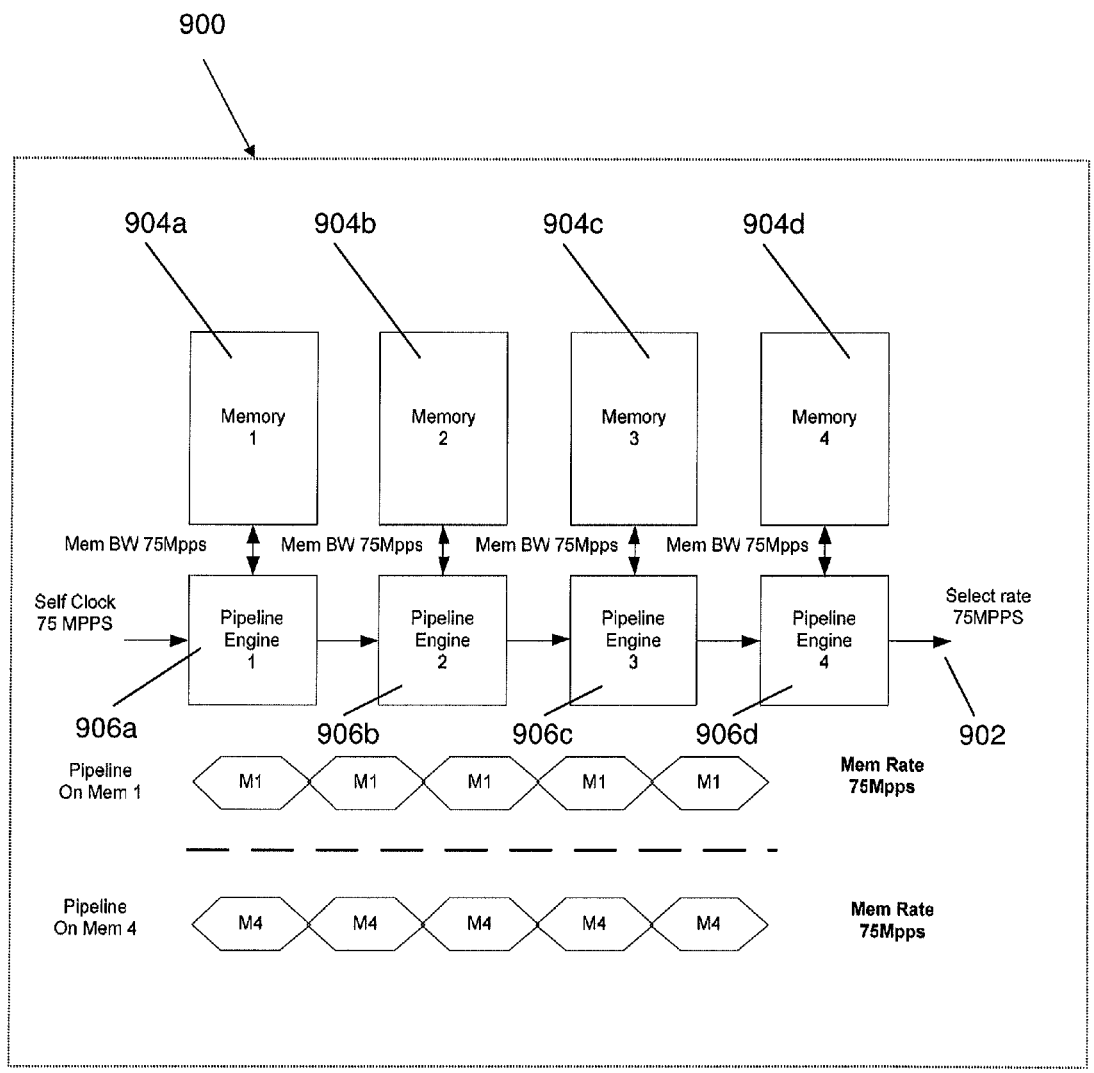
FIG. 9 shows a schematic diagram of a select process for selecting a hierarchical scheduling database memory by using a pipeline of hardware units.

FIG. 9 shows a schematic diagram of a select process 900 for selecting a hierarchical scheduling database memory 904a, 904b, 904c, 904d by using a pipeline of non-programmable hardware units 906a, 906b, 906c, 906d.

The select process 900 uses a target scheduling rate of 75 MPPS; and a 4 levels hierarchical scheduler.

The 75 MPPS is a numeric example, higher or lower rates are applicable. The four levels are a numeric example, higher or lower number of layers is applicable.

The database is stored in a memory 904a, 904b, 904c; 904d which is partitioned according to the number of hierarchy levels, in other words, 4 levels of hierarchy means 4 memory banks 904a, 904b, 904c, 904d. Each memory bank supports an access rate of 75 MPPS which corresponds to a total accumulate of all accesses needed to perform the select process 900. To each memory bank 904a, 904b, 904c, 904d a matching hardware pipeline engine 906a, 906b, 906c, 906d is attached.

The select flow is—

1. The select flow is initiated from self clock generator of 75 MPPS which invokes Pipeline Engine 1, 906a.

2. Pipeline Engine 1, 906a executes select by accessing Memory 1, 904a. The result of this select used by Pipeline Engine 1, 906a to invoke Pipeline Engine 2, 906b.

3. Pipeline Engine 2, 906b executes select by accessing Memory 2, 904b. The result of this select used by Pipeline Engine 2, 906b to invoke Pipeline Engine 3, 906c.

4. Pipeline Engine 3, 906c executes select by accessing Memory 3, 904c. The result of this select used by Pipeline Engine 3, 906c to invoke Pipeline Engine 4, 906d.

5. Pipeline Engine 4, 906d executes select by accessing Memory 4, 904d. Final result 902 of this select send to Queue Manager.

The high performance rate is achieved by creating pipeline behaviour over the memory. Each memory bank 904a, 904b, 904c, 904d is processed at 75 MPPS. Hence the overall scheduling rate is 75 MPPS.

Figure 10:
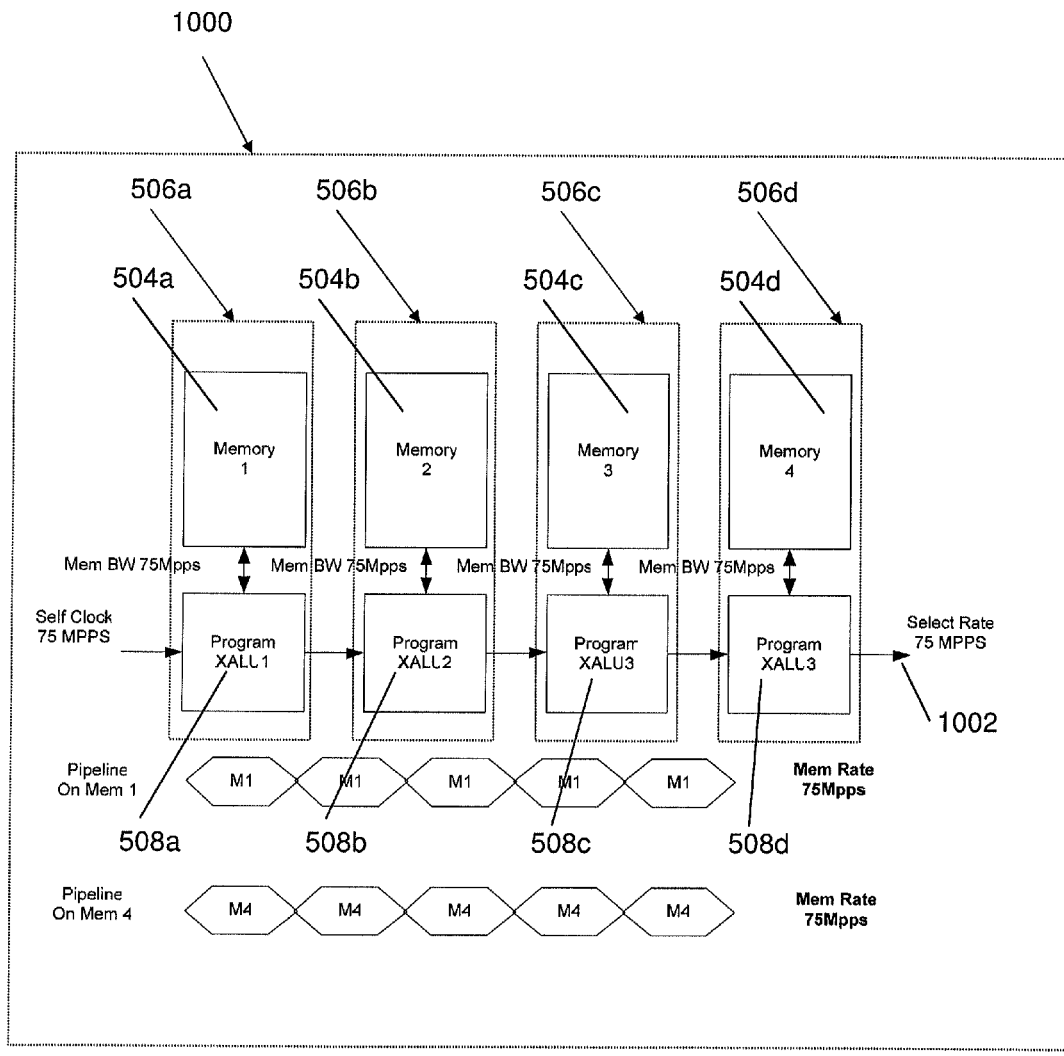
FIG. 10 shows a schematic diagram of a select process for selecting a hierarchical scheduling database memory by using a programmable pipeline of directly interconnected memory cluster units according to an implementation form.

FIG. 10 shows a schematic diagram of a select process 1000 for selecting a hierarchical scheduling database memory 504a, 504b, 504c, 504d by using a programmable pipeline of directly interconnected memory cluster units 506a, 506b, 506c, 506d according to an implementation form. The memory cluster units 506a, 506b, 506c, 506d correspond to the memory cluster units described with respect to FIG. 5.

The select process 1000 uses a memory load of programmable engines equal in performance to the non-programmable hardware units 906a, 906b, 906c, 906d as described with respect to FIG. 9. The select process 1000 uses the same numbers as the select process 900 described above with respect to FIG. 9, which is a target scheduling rate of 75 MPPS; and a 4 levels hierarchical scheduler The 75 MPPS is a numeric example, higher or lower rates are applicable. The four levels are a numeric example, higher or lower number of layers is applicable.

The memory structure is equivalent to the memory structure above described with respect to FIG. 9. The database 104 is stored in a memory 504a, 504b, 504c, 504d which is partitioned according to the number of hierarchy level, in other words 4 levels of hierarchy means 4 memories banks 504a, 504b, 504c, 504d. However, the memory structure is not limited to a number of four memory banks, any other number of memory banks corresponding to the number of hierarchy levels can be used.

Each memory bank 504a, 504b, 504c, 504d supports an access rate of 75 MPPS corresponding to a total accumulate of all accesses needed to perform the select process 1000. To each memory bank 504a, 504b, 504c, 504d a matching programmable engine 508a, 508b, 508c, 508d is attached. The matching programmable engines 508a, 508b, 508c, 508d are realized as XALU coprocessors, each of them implementing a 1-dimensional Systolic Array that loads the respective memory bank 504a, 504b, 504c, 504d at an access rate of 75 MPPS, while maintaining coherency and atomicity due to being a single memory user.

The select process 1000 is as follows:

1. The select flow is initiated from self clock generator of 75 MPPS which invokes XALU 1, 508a.

2. XALU 1, 508a executes select by accessing Memory 1, 504a. The result of this select is used by XALU 1, 508a to invoke XALU 2, 508b.

3. XALU 2, 508b executes select by accessing Memory 2, 504b. The result of this select is used by XALU 2, 508b to invoke XALU 3, 508c.

4. XALU 3, 508c executes select by accessing Memory 3, 504c. The result of this select is used by XALU 3, 508c to invoke XALU 4, 508d.

5. XALU 4, 508d executes select by accessing Memory 4, 504d. Final result 1002 of this select is send to Queue Manager which is Flow Queue Manager 202 depicted in FIG. 2.

The memory behaviour is identical to the memory behaviour of the select process 900 applied on the pipeline of non-programmable hardware units 906a, 906b, 906c, 906d described with respect to FIG. 9. The high performance rate of the select process 1000 is achieved by creating pipeline behaviour over the memory 504a, 504b, 504c and 504d. Each memory bank 504a, 504b, 504c, 504d is processed at an access rate of 75 MPPS. Hence, the overall scheduling rate is 75 MPPS.

Figure 11:
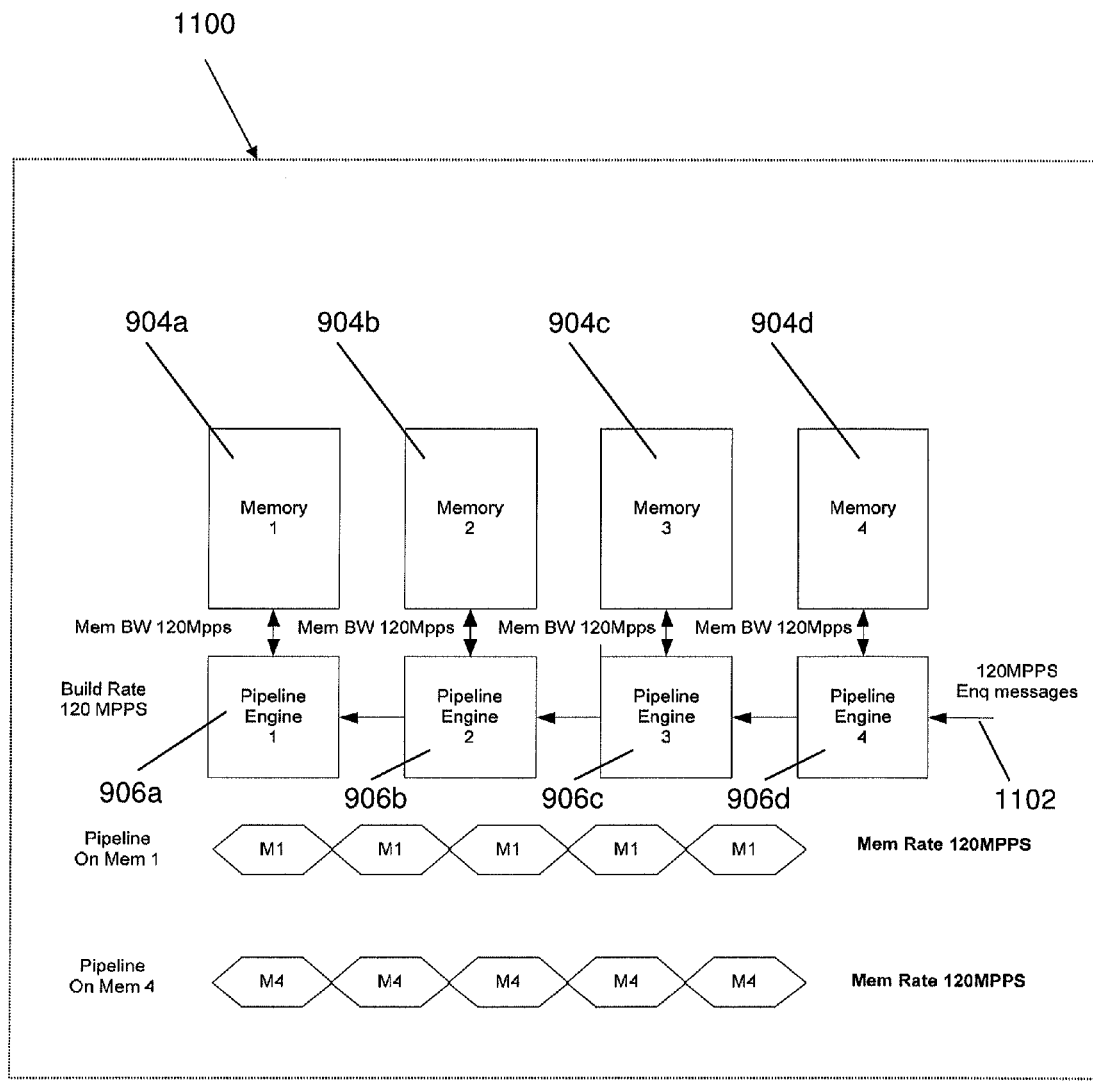
FIG. 11 shows a schematic diagram of a build process for building a hierarchical scheduling database memory by using a pipeline of hardware units.

FIG. 11 shows a schematic diagram of a build process 1100 for building a hierarchical scheduling database memory 904a, 904b, 904c, 904d by using a pipeline of non-programmable hardware units 906a, 906b, 906c, 906d.

The build process 1100 uses a target build rate of 120 MPPS; and a four levels hierarchical scheduler.

The 120 MPPS is a numeric example, higher or lower rates are applicable. The four levels are a numeric example, higher or lower number of layers is applicable.

The database is stored in a memory 904a, 904b, 904c and 904d which is partitioned according to the number of hierarchy levels, in other words four levels of hierarchy means four memory banks 904a, 904b, 904c, 904d. Each memory bank 904a, 904b, 904c, 904d supports an access rate of 120 MPPS corresponding to an accumulate of all accesses needed to perform the build process 1100. To each memory bank 904a, 904b, 904c, 904d a matching hardware pipeline engine is attached.

The build process 1100 is invoked by the flow queue state messages Enq (i) 1102 indicating that the flow queue (i) became not empty. The build process 1100 is as follows:

1. The build flow is initiated from Enq(i) messages 1102 arriving from queue manager. The maximum messages rate is 120 MMPS. Enq message 1102 invokes Pipeline Engine 4, 906d.
2. Pipeline Engine 4, 906d executes build by accessing Memory 4, 904d. The result of this build is used by Pipeline Engine 4, 906d to invoke Pipeline Engine 3, 906c.
3. Pipeline Engine 3, 906c executes build by accessing Memory 3, 904c. The result of this build is used by Pipeline Engine 3, 906c to invoke Pipeline Engine 2, 906b.
4. Pipeline Engine 2, 906b executes build by accessing Memory 2, 904b. The result of this build is used by Pipeline Engine 2, 906b to invoke Pipeline Engine 1, 906a.
5. Pipeline Engine 1, 906a completes build by accessing Memory 1, 904a.

The high performance rate is achieved by creating pipeline behaviour over the memory 904a, 904b, 904c and 904d. Each memory bank 904a, 904b, 904c, 904d is processed at a rate of 120 MPPS. Hence, the overall build rate is 120 MPPS.

Figure 12:
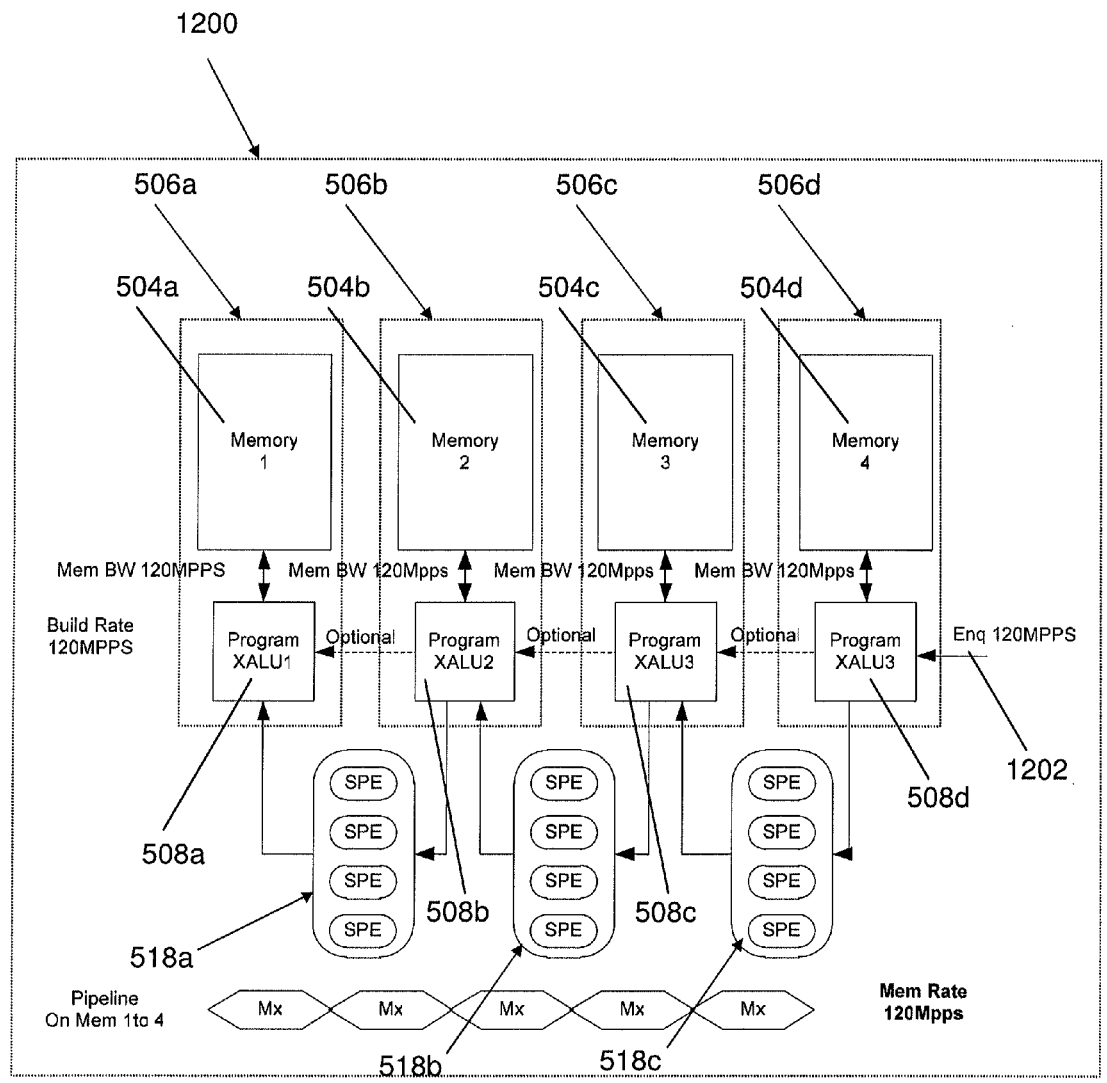
FIG. 12 shows a schematic diagram of a build process for building a hierarchical scheduling database memory by using a programmable pipeline of memory cluster units interconnected by a shared collection of SPEs according to an implementation form.

FIG. 12 shows a schematic diagram of a build process 1200 for building a hierarchical scheduling database memory 104 as described with respect to FIG. 3 by using a programmable pipeline of memory cluster units 506a, 506b, 506c, 506d interconnected by a shared collection of SPEs 518a, 518b, 518c according to an implementation form. The memory cluster units 506a, 506b, 506c, 506d correspond to the memory cluster units described with respect to FIG. 5.

The build process 1200 uses a memory load of programmable engines equal in performance to the non-programmable hardware units 906a, 906b, 906c, 906d as described with respect to FIG. 11. The build process 1200 uses the same numbers as the build process 1100 described above with respect to FIG. 11, which is a target build rate of 120 MPPS; and a four levels hierarchical scheduler The 120 MPPS is a numeric example, higher or lower rates are applicable. The four levels are a numeric example, higher or lower number of layers is applicable.

The memory structure is equivalent to the memory structure above described with respect to FIG. 11. The database 104 is stored in a memory 504a, 504b, 504c, 504d which is partitioned according to the number of hierarchy level, in other words 4 levels of hierarchy means 4 memories banks 504a, 504b, 504c, 504d. However, the memory structure is not limited to a number of four memory banks, any other number of memory banks corresponding to the number of hierarchy levels can be used.

Each memory bank 504a, 504b, 504c, 504d supports an access rate of 120 MPPS corresponding to a total accumulate of all accesses needed to perform the build process 1200. To each memory bank 504a, 504b, 504c, 504d a matching programmable engine 508a, 508b, 508c, 508d is attached. The matching programmable engines 508a, 508b, 508c, 508d are realized as XALU coprocessors, each of them implementing a 1-dimensional Systolic Array that loads the respective memory bank 504a, 504b, 504c, 504d at an access rate of 75 MPPS, while maintaining coherency and atomicity due to being a single memory user.

Two principal build processes 1200 are used, a basic build process 1200a and an advanced build process 1200b.

The basic build process 1200a uses only XALU engines 508a, 508b, 508c, 508d and is illustrated in FIG. 12 by the direct arrows between the XALU engines 508a, 508b, 508c, 508d which are named as "Optional". The basic build process 1200a is as follows:

1. The build flow is initiated from Enq(i) messages 1202 arriving from queue manager which corresponds to the flow queue manager 202 described with respect to FIG. 2. The maximum messages rate is 120 MMPS. The Enq messages 1202 invoke XALU 4, 508d.
2. XALU 4, 508d executes build by accessing Memory 4, 504d. The result of this build is used by XALU 4, 508d to invoke XALU 3, 508c.
3. XALU 3, 508c executes build by accessing Memory 3, 504c. The result of this build is used by XALU 3, 508c to invoke XALU 2, 508b.
4. XALU 2, 508b executes build by accessing Memory 2, 504b. The result of this build is used by XALU 2, 508b to invoke XALU 1, 508a.
5. XALU 1, 508a completes build by accessing Memory 1, 504a.

In the fully flexible build process 1200b also called advanced build process 1200b additional level of programmability capacity is achieved by streaming the build process 1200b through parallel SPEs cluster 518a, 518b, 518c. In an implementation form these SPEs cluster 518a, 518b, 518c are implemented as standard RISC engines. A programmable super pipeline is created, wherein each result of XALU (i) 508a, 508b, 508c, 508d invokes an SPE 518a, 518b, 518c for further processing. In an implementation form, the further processing is a priority remapping in the hierarchical traffic scheduling device 500.

The algorithm structure of the build process 1200b enables a parallel distribution of tasks to independent SPEs 518a, 518b, 518c. The number of SPEs 518a, 518b, 518c is sufficient to support the required rate of 120 MPPS. The result of an SPE 518a, 518b and 518c is handed to a next XALU 508a, 508b, 508c, 508d.

In the advanced build process 1200b, XALU 508a, 508b, 508c, 508d and SPE engines 518a, 518b, 518c are used. The advanced build process 1200b is as follows:

1. The build flow is initiated from Enq(i) messages 1202 arriving from queue manager which corresponds to the flow queue manager 202 described with respect to FIG. 2. The maximum messages rate is 120 MMPS. The Enq messages 1202 invoke XALU 4, 508d.
2. XALU 4, 508d executes build by accessing Memory 4, 504d. The result of this build is used by XALU 4, 508d to invoke a free SPE, 518c.
3. SPE, 518c processes build. The SPE, 518c result invokes XALU 3, 508c.
4. XALU 3, 508c executes build by accessing Memory 3, 504c. The result of this build is used by XALU 3, 508c to invoke a free SPE, 518b.
5. SPE, 518b processes build. The SPE, 518b result invokes XALU 2, 508b.
6. XALU 2, 508b executes build by accessing Memory 2, 504b. The result of this build is used by XALU 2, 508b to invoke a free SPE, 518a.

7. SPE, 518*a* processes build. The SPE, 518*a* result invokes XALU 1, 508*a*.

8. XALU 1, 508*a* completes build by accessing Memory 1, 504*a*.

In an implementation form, other permutations of basic build process 1200*a* to advance build process 1200*b* are created by software. In an implementation form, some of the hierarchy levels are processed through XALU only, corresponding to the basic build process, while the other hierarchy levels are processed through XALU and SPE corresponding to the advanced or also called the combo build process 1200*b*.

The memory behaviour is identical to the memory behaviour of the build process 1100 applied on the pipeline of non-programmable hardware units 906*a*, 906*b*, 906*c*, 906*d* described with respect to FIG. 11. The high performance rate of the build process 1200 is achieved by creating pipeline behaviour over the memory 504*a*, 504*b*, 504*c* and 504*d*. Each memory bank 504*a*, 504*b*, 504*c*, 504*d* is processed at an access rate of 120 MPPS. Hence, the overall build rate is 120 MPPS.

The software architecture of the traffic scheduling device 500 is built on concurrent (parallel) execution of scheduling tasks. The software architecture is an event driven system. The inputs events are independent.

An exemplary list of input events comprises:
Build Type Events
Flow Queue manager state messages, each message (event) is processed independently;
Updates following select;
Internal State variable threshold cross used for deficit counters and shapers, each event is processed independently;
Select Type Events
Self Clock root trigger, each event is processed independently.

The concurrent execution is achieved in two dimensions:
Events are processed independently
Typically an event needs to process several hierarchy levels (nodes) of the data base. The second dimension of concurrency is concurrent processing per database layers.

Figure 13:
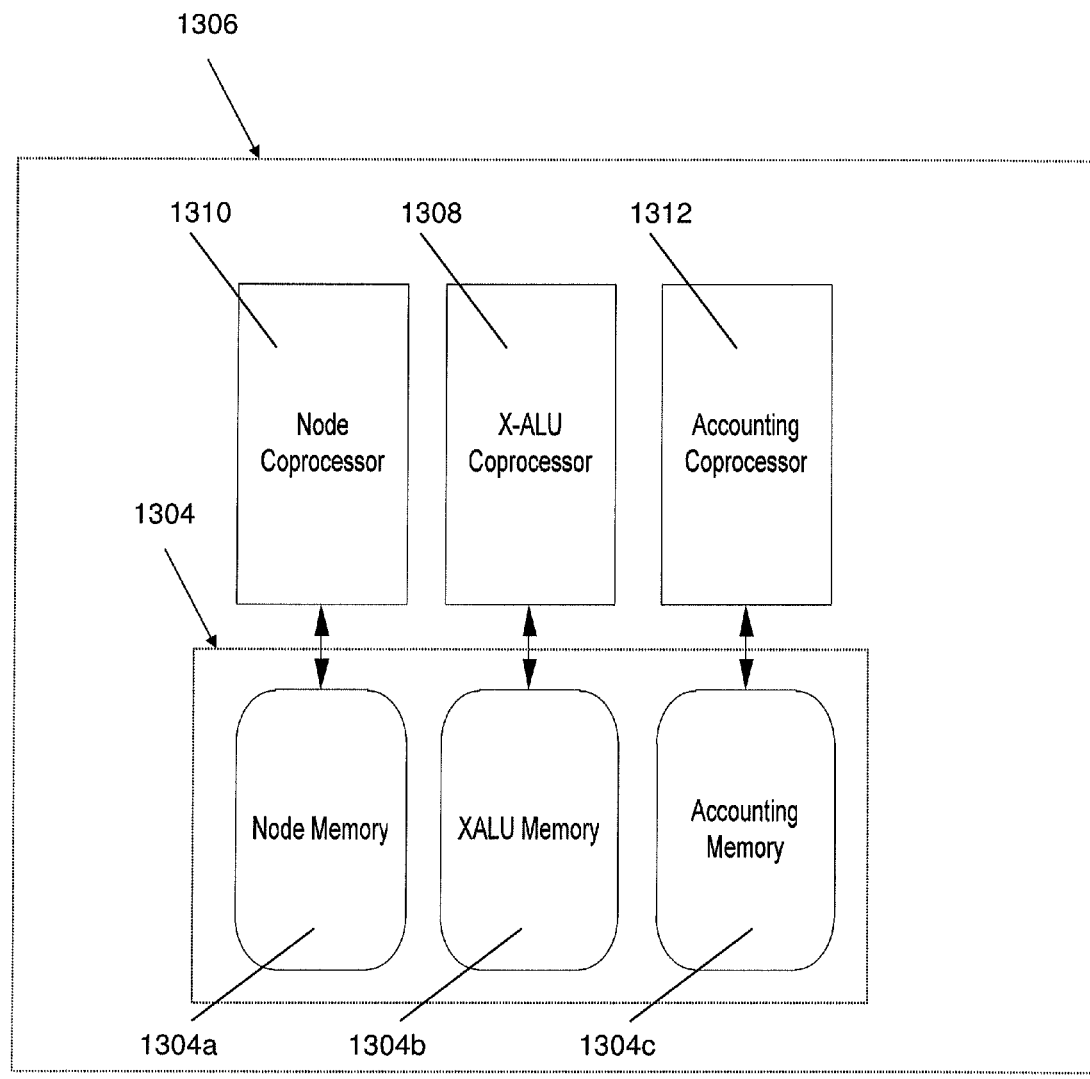
FIG. 13 shows a block diagram of a Memory Cluster Unit according to an implementation form.

The outcome a deep concurrency (parallelization) of an immense number of independent tasks that are executed on independent processors/co-processors FIG. 13 shows a block diagram of a Memory Cluster Unit 1306 according to an implementation form, specified as MCU type A.

Three coprocessor engines 1310, 1308 and 1312 are shown. The hierarchical memory 1304 is implemented via partitioning to three functional banks 1304*a*, 1304*b*, 1304*c* each tightly coupled to its associated coprocessor 1310, 1308 and 1312. The node memory 1304*a* is tightly coupled to the node coprocessor 1310, the XALU memory 1304*b* is tightly coupled to the X-ALU coprocessor 1308 and the accounting memory 1304*c* is tightly coupled to the accounting coprocessor 1312.

Figure 14:
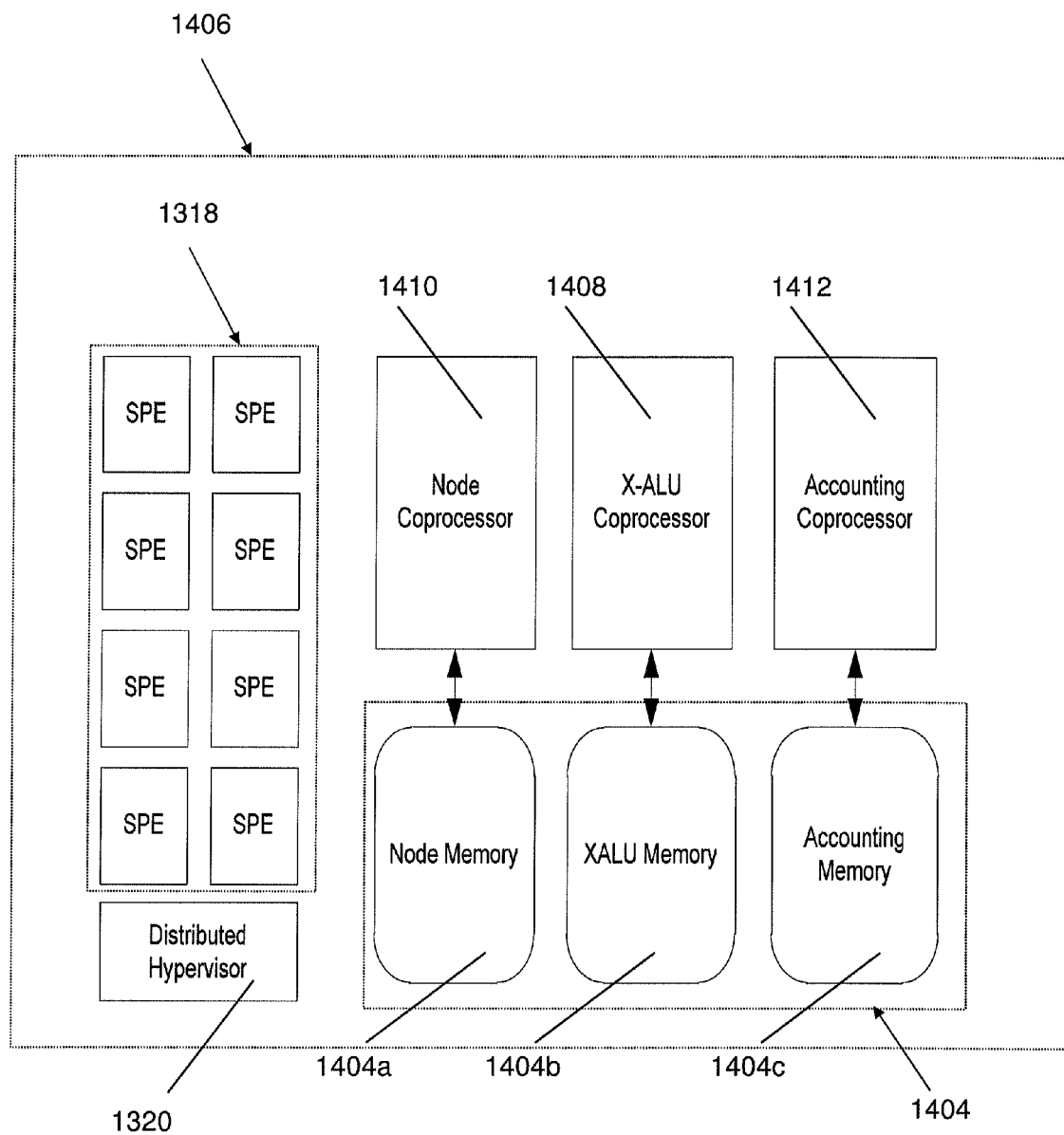
FIG. 14 shows a block diagram of a Memory Cluster Unit according to an implementation form.

FIG. 14 shows a block diagram of a Memory Cluster Unit 1406 according to an implementation form, specified as MCU type B.

Three coprocessor engines 1410, 1408 and 1412 are shown. The hierarchical memory 1404 is implemented via partitioning to three functional banks 1404*a*, 1404*b*, 1404*c* each tightly coupled to its associated coprocessor 1410, 1408 and 1412. The node memory 1404*a* is tightly coupled to the node coprocessor 1410, the XALU memory 1404*b* is tightly coupled to the X-ALU coprocessor 1408 and the accounting memory 1404*c* is tightly coupled to the accounting coprocessor 1412.

Instead of the global SPE cluster 518 as described with respect to FIG. 5, a distributed collection of SPEs 1318 and a distributed supervisor, called hypervisor 1320, is used per MCU 1406.

Figure 15:
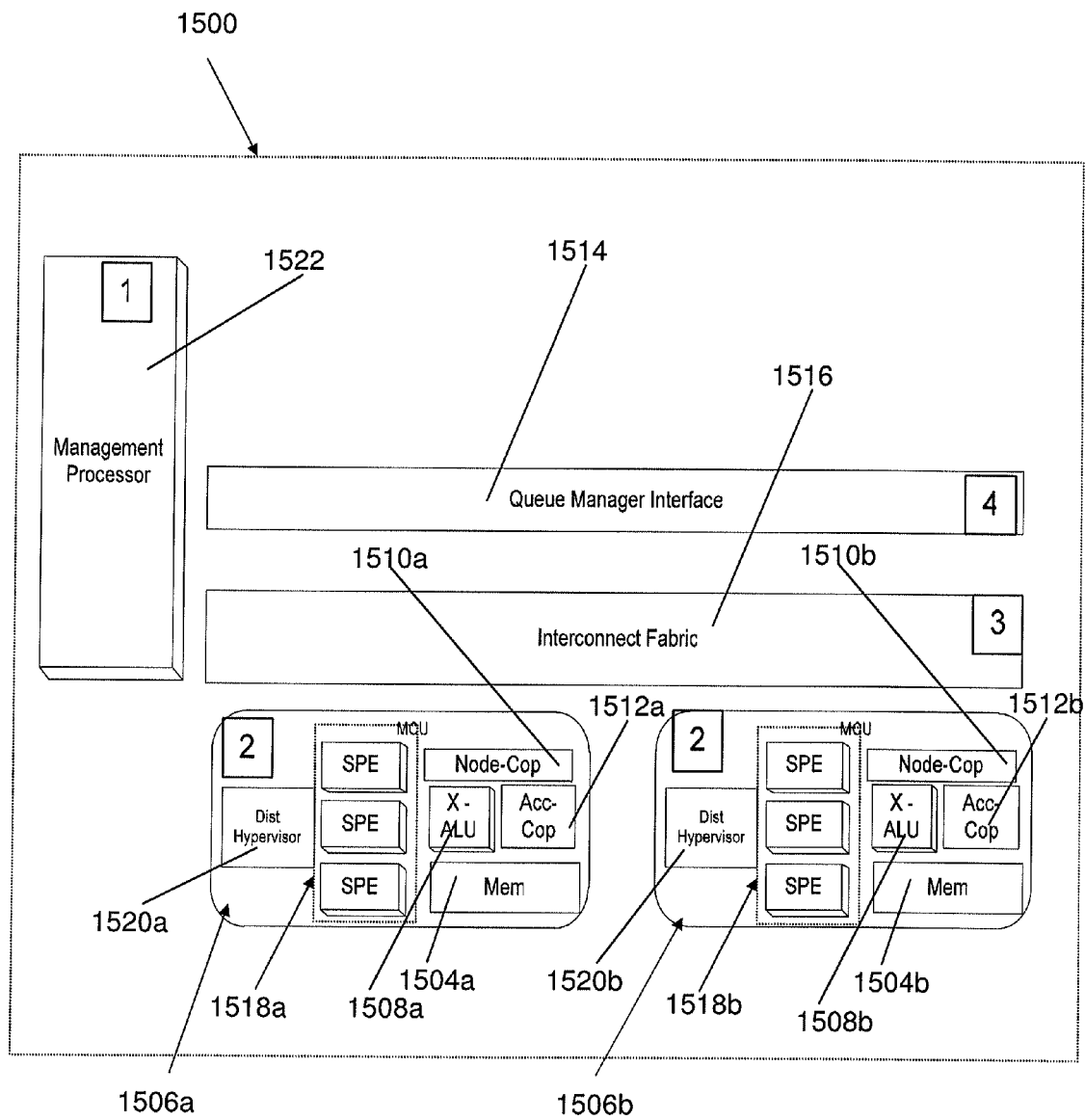
FIG. 15 shows a block diagram of a traffic scheduling device according to an implementation form.

FIG. 15 shows a block diagram of a traffic scheduling device 1500 according to an implementation form. The modified full chip architecture is based on the architecture described with respect to FIG. 5 but different memory cluster units 506*a*, 506*b*, 506*c*, namely MCU type B, 1406 as described with respect to FIG. 14, are used.

The traffic scheduling device 1500 comprises an exemplary number of two (which may be any other number of) memory cluster units 1506*a*, 1506*b*, each of them comprising a node co-processor 1510*a*, 1510*b*, an X-ALU 1508*a*, 1508*b*, an accounting co-processor 1512*a*, 1512*b*, a memory 1504*a*, 1504*b*, a distributed collection of SPEs 1518*a*, 1518*b* and a distributed supervisor (hypervisor) 1520*a*, 1520*b*. The traffic scheduling device 1500 further comprises an interconnect fabric 1516 for interconnecting the memory cluster units 1506*a*, 1506*b*, a queue manager interface 1514 forming the interface to a flow queue manager 202 as described with respect to FIG. 2 and an optional management processor 1522 for configuring and maintaining the hierarchical scheduling database which is formed by the memories 1504*a* and 1504*b*.

Thus, the subunits of the traffic scheduling device 1500 are:
1. An optional Management Processor 1522 which constructs and maintains the hierarchical database and which receives member setup/add/teardown/modify commands from upper layer host entity.
2. MCU, the Memory Cluster Units 1506*a*, 1506*b*. Each MCU 1506*a*, 1506*b* is associated with a hierarchical database level. Memory repository 1504*a*, 1504*b* which may be several physical memories together with associated tightly coupled to memory co-processors units 1508*a*, 1510*a*, 1512*a*, 1508*b*, 1510*b*, 1512*b* distributed SPEs cluster 1518*a*, 1518*b* and distributed hypervisor 1520*a*, 1520*b*.
3. Interconnect Fabric 1516 which connects between the MCUs 1506*a*, 1506*b*.
4. Queue Manager Interface 1514.

In another implementation form the management processor 1522 is replaced by an external processor to execute internal management processor tasks. This is applicable to all three architectures presented in FIG. 5 described above, FIG. 15 described above and FIG. 16 described below. The traffic scheduling device 1500 with or without management processor 1522 can be implemented on a single chip.

Figure 16:
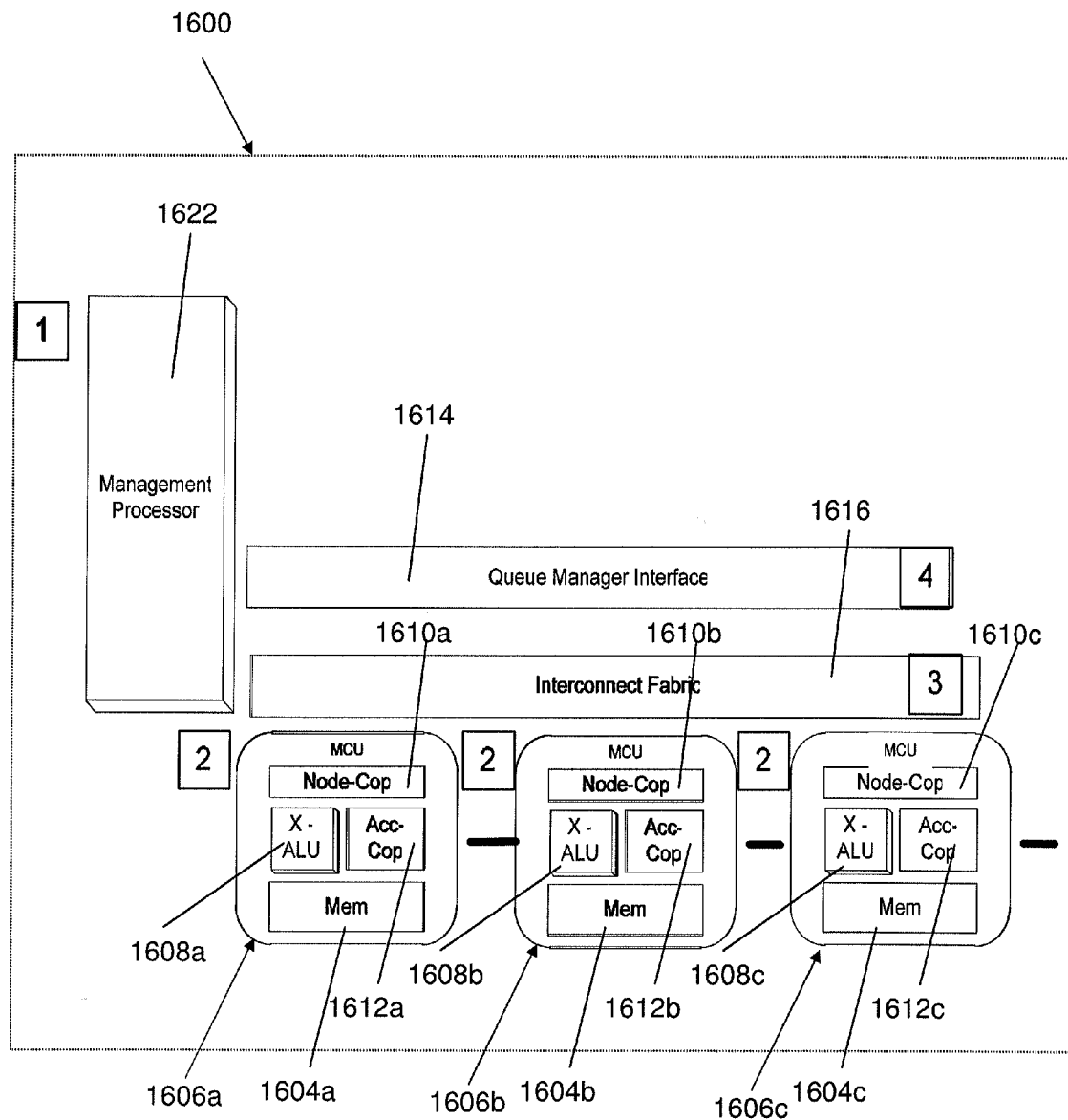
FIG. 16 shows a block diagram of a traffic scheduling device according to an implementation form.

FIG. 16 shows a block diagram of a traffic scheduling device 1600 according to an implementation form. The modified full chip architecture is based on the architecture described with respect to FIG. 5 where the memory cluster units 506*a*, 506*b*, 506*c* are implemented by MCU type A, 1306 as described with respect to FIG. 13 and no shared messaging system 524, no collection of SPEs 518 and no supervisor (hypervisor) 520 is required.

The traffic scheduling device 1600 comprises an exemplary number of three (which may be any other number of) memory cluster units 1606*a*, 1606*b*, 1606*c* each of them comprising a node co-processor 1610*a*, 1610*b*, 1610*c* an X-ALU 1608*a*, 1608*b*, 1608*c* an accounting co-processor 1612*a*, 1612*b*, 1612*c* and a memory 1604*a*, 1604*b*, 1604*c*. The traffic scheduling device 1600 further comprises an interconnect fabric 1616 for interconnecting the memory cluster units 1606*a*, 1606*b*, 1606*c*, a queue manager interface 1614 forming the interface to a flow queue manager 202 as described with respect to FIG. 2 and an optional management processor 1622 for configuring and maintaining the hierarchical scheduling database which is formed by the memories 1604a, 1604b and 1604b.

Thus, the subunits of the traffic scheduling device 1600 are:

1. An optional Management Processor 1622 which constructs and maintains the hierarchical database and which receives member setup/add/teardown/modify commands from upper layer host entity.

2. MCU, the Memory Cluster Units 1606a, 1606b, 1606c. Each MCU 1606a, 1606b, 1606c is associated with a hierarchical database level. Memory repository 1604a, 1604b, 1604c which may be several physical memories together with associated tightly coupled to memory co-processors units 1608a, 1610a, 1612a, 1608b, 1610b, 1612b, 1608c, 1610c, 1612c.

3. Interconnect Fabric 1616 which connects between the MCUs 1606a, 1606b.

4. Queue Manager Interface 1614.

In another implementation form the management processor 1622 is replaced by an external processor to execute internal management processor tasks. This is applicable to all three architectures presented in FIG. 5 described above, FIG. 15 described above and FIG. 16 described here. The traffic scheduling device 1600 with or without management processor 1622 can be implemented on a single chip.

From the foregoing, it will be apparent to those skilled in the art that a variety of devices, methods, systems, computer programs on recording media, and the like, are provided.

The present disclosure also supports a computer program product including computer executable code or computer executable instructions that, when executed, causes at least one computer to execute the performing and computing steps described herein.

The present disclosure also supports a system configured to execute the performing and computing steps described herein.

Many alternatives, modifications, and variations will be apparent to those skilled in the art in light of the above teachings. Of course, those skilled in the art readily recognize that there are numerous applications of the disclosure beyond those described herein. While the present disclosures has been described with reference to one or more particular embodiments, those skilled in the art recognize that many changes may be made thereto without departing from the scope of the present disclosure. It is therefore to be understood that within the scope of the appended claims and their equivalents, the disclosures may be practiced otherwise than as specifically described herein.

We claim:

1. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:

a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm; and an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues;

wherein the hierarchical scheduling database is tree-structured from a root interface of physical ports per physical interface representing a highest level of hierarchy down to the plurality of traffic flow queues representing a lowest level of hierarchy, the hierarchical scheduling database comprising at least one of the following intermediate levels of hierarchy:

a level of sub ports per physical port, a level of subscriber groups per sub port, a level of subscribers per subscriber group, and a level of traffic flow queues per subscriber.

2. The traffic scheduling device of claim 1, further comprising a management processor configured to construct and maintain the hierarchical scheduling database based on configuration commands of upper layer entities.

3. The traffic scheduling device of claim 1, wherein the co-processors are configured to implement an event-driven software architecture.

4. The traffic scheduling device of claim 1, wherein the scheduling algorithm comprises a select process traversing the hierarchical scheduling database from the root interface towards the plurality of flow queues, at each level of the hierarchical scheduling database choosing members of the hierarchical scheduling database based on their eligibility for scheduling state.

5. The traffic scheduling device of claim 4, wherein the scheduling algorithm comprises one of the following but is not limited to:

a weighted fair queuing (WFQ) algorithm, a weighted round robin (WRR) algorithm, a modified deficit round robin (MDRR) algorithm, a strict priority algorithm, and a first come first serve algorithm.

6. The traffic scheduling device of claim 4, wherein the scheduling algorithm comprises a build process traversing the hierarchical scheduling database, in particular traversing from the plurality of traffic flow queues towards the root interface, at each level of the hierarchical scheduling database updating the eligibility for scheduling state of the members of the hierarchical scheduling database.

7. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:

a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm; and an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues;

wherein each of the plurality of memory cluster units or a group of the memory cluster units is coupled to an associated node co-processor configured to process topology mapping information of the hierarchical scheduling database and to process data fields mapping information of nodes of the hierarchical scheduling database.

8. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:
- a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm; and
- an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues;
- wherein each of the plurality of memory cluster units or a group of the memory cluster units is coupled to an associated accounting co-processor configured to process shapers, policers and counters related to the scheduling algorithm.

9. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:
- a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm; and
- an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues;
- wherein each of the plurality of memory cluster units or a group of the memory cluster units is coupled to an associated Enhanced Arithmetic Logic co-processor Unit performing computing operations on the hierarchical scheduling database.

10. The traffic scheduling device of claim 9, wherein each of the Enhanced Arithmetic Logic co-processor Units comprises a linear systolic array of VLIW processors.

11. The traffic scheduling device of claim 9, wherein the Enhanced Arithmetic Logic co-processor Units are dynamically or statically directly interconnectable with respect to each other for processing the memory cluster units in a pipelined manner with respect to the levels of the hierarchical scheduling database.

12. The traffic scheduling device of claim 9, wherein the Enhanced Arithmetic Logic co-processor Units are dynamically or statically interconnectable with respect to each other via a shared global collection of Scheduling Processor Elements for processing the memory cluster units in a pipelined manner with respect to the levels of the hierarchical scheduling database, the Scheduling Processor Elements comprising RISC/CISC processors.

13. The traffic scheduling device of claim 9, wherein the Enhanced Arithmetic Logic co-processor Units are dynamically or statically interconnectable with respect to each other via distributed collections of Scheduling Processor Elements assigned to one or more of the plurality of memory cluster units for processing the memory cluster units in a pipelined manner with respect to the levels of the hierarchical scheduling database, the Scheduling Processor Elements comprising RISC/CISC processors.

14. The traffic scheduling device of claim 12, wherein each of the collections of Scheduling Processor Elements is supervised by a supervising unit.

15. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:
- a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm;
- an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues; and
- a management processor configured to construct and maintain the hierarchical scheduling database based on configuration commands of upper layer entities;
- wherein the hierarchical scheduling database is tree-structured from a root interface of physical ports per physical interface representing a highest level of hierarchy down to the plurality of traffic flow queues representing a lowest level of hierarchy, the hierarchical scheduling database comprising at least one of the following intermediate levels of hierarchy:
- a level of sub ports per physical port,
- a level of subscriber groups per sub port,
- a level of subscribers per subscriber group, and
- a level of traffic flow queues per subscriber.

16. The traffic scheduling device of claim 15, wherein the scheduling algorithm comprises a select process traversing the hierarchical scheduling database from the root interface towards the plurality of flow queues, at each level of the hierarchical scheduling database choosing members of the hierarchical scheduling database based on their eligibility for scheduling state.

17. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:

a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm;

an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues; and a management processor configured to construct and maintain the hierarchical scheduling database based on configuration commands of upper layer entities;

wherein each of the plurality of memory cluster units or a group of the memory cluster units is coupled to an associated node co-processor configured to process topology mapping information of the hierarchical scheduling database and to process data fields mapping information of nodes of the hierarchical scheduling database.

18. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:

a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm;

an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues; and a management processor configured to construct and maintain the hierarchical scheduling database based on configuration commands of upper layer entities;

wherein each of the plurality of memory cluster units or a group of the memory cluster units is coupled to an associated accounting co-processor configured to process shapers, policers and counters related to the scheduling algorithm.

19. A traffic scheduling device for scheduling a transmission sequence of data packets, stored in a plurality of traffic flow queues, an eligibility state of each of the traffic flow queues for the scheduling being maintained in a hierarchical scheduling database describing a relationship among the plurality of traffic flow queues, the traffic scheduling device comprising:

a plurality of interconnected memory cluster units, each memory cluster unit being associated to a single or more levels of the hierarchical scheduling database and each memory cluster unit being coupled to at least one co-processors, at least one co-processor being software-programmable to implement a scheduling algorithm;

an interface to the plurality of traffic flow queues, the interface being used to identify one or more packets associated to a particular traffic flow queue selected for transmission according to the scheduling algorithm and the interface being configured to signal the eligibility state of each of the traffic flow queues of the plurality of traffic flow queues; and a management processor configured to construct and maintain the hierarchical scheduling database based on configuration commands of upper layer entities;

wherein each of the plurality of memory cluster units or a group of the memory cluster units is coupled to an associated Enhanced Arithmetic Logic co-processor Unit performing computing operations on the hierarchical scheduling database.

* * * * *